(12) United States Patent
Shirane et al.

(10) Patent No.: US 8,067,115 B2
(45) Date of Patent: Nov. 29, 2011

(54) NON-AQUEOUS ELECTROLYTE SECONDARY BATTERY

(75) Inventors: Takayuki Shirane, Osaka (JP); Kaoru Inoue, Osaka (JP); Masaya Ugaji, Osaka (JP); Masato Fujikawa, Osaka (JP); Toshitada Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 947 days.

(21) Appl. No.: 12/030,528

(22) Filed: Feb. 13, 2008

(65) Prior Publication Data

US 2008/0193840 A1 Aug. 14, 2008

(30) Foreign Application Priority Data

Feb. 13, 2007 (JP) .................. 2007-031804
Aug. 9, 2007 (JP) .................. 2007-207593

(51) Int. Cl.
  *H01M 4/13* (2010.01)
  *H01M 4/58* (2010.01)
(52) U.S. Cl. .............. 429/218.1; 429/209; 429/133
(58) Field of Classification Search .......... 429/209, 429/218.1, 133; *H01M 4/02, 4/13, 4/58, H01M 4/36*
See application file for complete search history.

(56) References Cited

U.S. PATENT DOCUMENTS

2008/0171263 A1* 7/2008 Ugaji et al. .............. 429/218.1
2009/0123840 A1* 5/2009 Shirane et al. ............ 429/220
2009/0162746 A1* 6/2009 Honda ...................... 429/133

FOREIGN PATENT DOCUMENTS

| JP | 2005-196970 | | 7/2005 |
| WO | WO 2007046322 A1 | * | 4/2007 |
| WO | WO 2007074654 A1 | * | 7/2007 |

* cited by examiner

*Primary Examiner* — Jennifer K. Michener
*Assistant Examiner* — Heng Chan
(74) *Attorney, Agent, or Firm* — McDermott Will & Emery LLP

(57) ABSTRACT

A non-aqueous electrolyte secondary battery comprising at least a negative electrode having a current collector provided thereon with convex portions and columnar bodies formed on the convex portions, each of the columnar bodies comprising n stages (where $n \geq 2$) of overlaid columnar body portions alternately tilted to different orientations along a longitudinal direction of the current collector, a positive electrode having a positive electrode current collector provided on both surfaces thereof with a positive electrode mixture layer containing a positive electrode active material capable of inserting and extracting lithium ions reversibly, and a separator interposed between the positive electrode and the negative electrode in a confronting manner, wherein tip portions of the columnar body portions at the uppermost stage of the columnar bodies on the negative electrode are tilted toward a trailing end of winding direction.

9 Claims, 12 Drawing Sheets

Trailing end of winding

Leading end of winding

Trailing end of winding ⟵⟶ Leading end of winding

Discharge

NON-AQUEOUS ELECTROLYTE SECONDARY BATTERY

BACKGROUND OF THE INVENTION

1. Field of the Invention

The present invention relates to a non-aqueous electrolyte secondary battery of a cylindrical configuration, and more specifically to a negative electrode structure of the same.

2. Background Art

With the advancement in recent years of electronic apparatuses for their portability and cordless operation, secondary batteries such as nickel hydrogen batteries and lithium ion batteries gain attention as driving power sources because they are smaller in size, lighter in weight and higher in energy density.

A typical lithium ion secondary battery comprises a positive electrode made of a complex oxide containing lithium, a negative electrode containing a lithium metal, a lithium alloy or a negative electrode active material capable of inserting and extracting lithium ions, and an electrolyte.

There are also some researches reported in recent years on certain elements having the property of inserting lithium ions and theoretical capacity densities exceeding 833 mAh/cm$^3$ in place of carbon materials such as graphite that have been used conventionally as the negative electrode material. Silicon (Si), tin (Sn) and germanium (Ge) having the property of alloying well with lithium, oxides and alloys of these elements are some examples of the elements used for the negative electrode active material having the theoretical capacity density exceeding 833 mAh/cm$^3$. Of these materials, silicon particles and silicon-containing particles such as silicon oxide particles are studied broadly as less expensive alternatives.

However, any of these materials has such a property that its volume increases when inserting lithium ions. In the case of using a negative electrode having a negative electrode active material composed of Si, for instance, the negative electrode active material changes to a substance symbolized by $Li_{4.4}Si$ under a state of inserting lithium ions to its maximum level, and a ratio of increase in volume of the active material reaches up to 4.12 times.

For the foregoing reason, the negative electrode active material expands and contracts as it inserts and extracts lithium ions. There was thus a possibility that the negative electrode active material separates from the negative electrode current collector due to weakening of adhesion between them over repeated cycles of charging and discharging.

Japanese Patent Unexamined Publication, No. 2005-196970 ("patent document 1") is directed to address the above problem, and it discloses a method of forming a negative electrode, wherein a current collector is provided with convex portions and concave portions on its surface, and a film-like negative electrode material is formed thereon in a tilting orientation with respect to a plane perpendicular to the main surface of the negative electrode material.

According to the patent document 1, the negative electrode material of a pillar shape formed in a tilting angle on the convex portions of the current collector is overlaid with a separator and a positive electrode to make an electrode group, which is then wound to complete the secondary battery of a cylindrical configuration. It indicates that this structure can distribute stresses produced by expansion and contraction of the negative electrode material due to electric charges and discharges into directions of both parallel and perpendicular to the main surface of the negative electrode material, thereby preventing wrinkles and separation from being developed.

However, it is necessary to reduce the size of the electrode group in consideration of anticipated changes in shape of the electrode group so as to fit in the battery case since its diameter increase due to the expansion of the negative electrode active material by insertion of lithium ions. This gives rise to a problem that a space inside the battery case cannot be used effectively, thereby limiting improvement of the battery capacity. Besides, a large stress is developed upon the pillar-shaped negative electrode material due to the expansion of the negative electrode group because the size of the secondary battery is restricted by the dimensions of the battery case. In addition, since the pillar-shaped negative electrode material is connected to the current collector at the convex portions, in particular, the stress is likely to concentrate on the junctions, thereby giving rise to another problem that the pillar-shaped negative material separates from the current collector. There is also another possibility that the current collector wrinkles or deforms even if the negative electrode material remains not separated. There are cases as a consequence that the cycle characteristics and reliability became impaired.

SUMMARY OF THE INVENTION

A non-aqueous electrolyte secondary battery of the present invention comprises at least a negative electrode having a current collector provided thereon with convex portions and columnar bodies formed on the convex portions, each of the columnar bodies comprising n stages (where n≧2) of columnar body portions overlaid one after another in a manner to tilt alternately to different orientations along a longitudinal direction of the current collector, a positive electrode having a positive electrode current collector provided on both surfaces thereof with a positive electrode mixture layer containing a positive electrode active material capable of inserting and extracting lithium ions reversibly, and a separator interposed between the positive electrode and the negative electrode in a confronting manner, wherein tip portions of the columnar body portions at the uppermost stage of the columnar bodies on the negative electrode are tilted toward a trailing end of winding direction.

This structure can reduce concentration of stresses on junctions of the columnar bodies by distributing them to a plurality of the columnar body portions of different tilting orientations composing the columnar bodies. In addition, the structure enables designing of an electrode group of a size nearly equal to an inner diameter of a battery case since a stress developed upon the current collector of the negative electrode by expansion of the columnar bodies during a charging process and acting horizontally on the current collector makes the electrode group deform in a manner to tighten the wound shape, and the electrode group regains its original shape only during a discharging process. As a result, the invention not only improves a battery capacity by the effect of the negative electrode active material, but also increase the battery capacity further by enabling expansion of an overall area of the electrode. The invention can thus achieve the non-aqueous electrolyte secondary battery of high reliability with substantial improvements in a cycle characteristics and a high-rate discharge characteristics.

DETAILED DESCRIPTION OF THE INVENTION

Description is provided hereinafter of certain exemplary embodiments of the present invention with reference to the accompanying drawings. It should be understood, however, that the following description is not to be taken in a limited sense, but the invention may be embodied or practiced in still many other ways as long as they conform to the essential character described in this specification.

First Exemplary Embodiment

Figure 1:
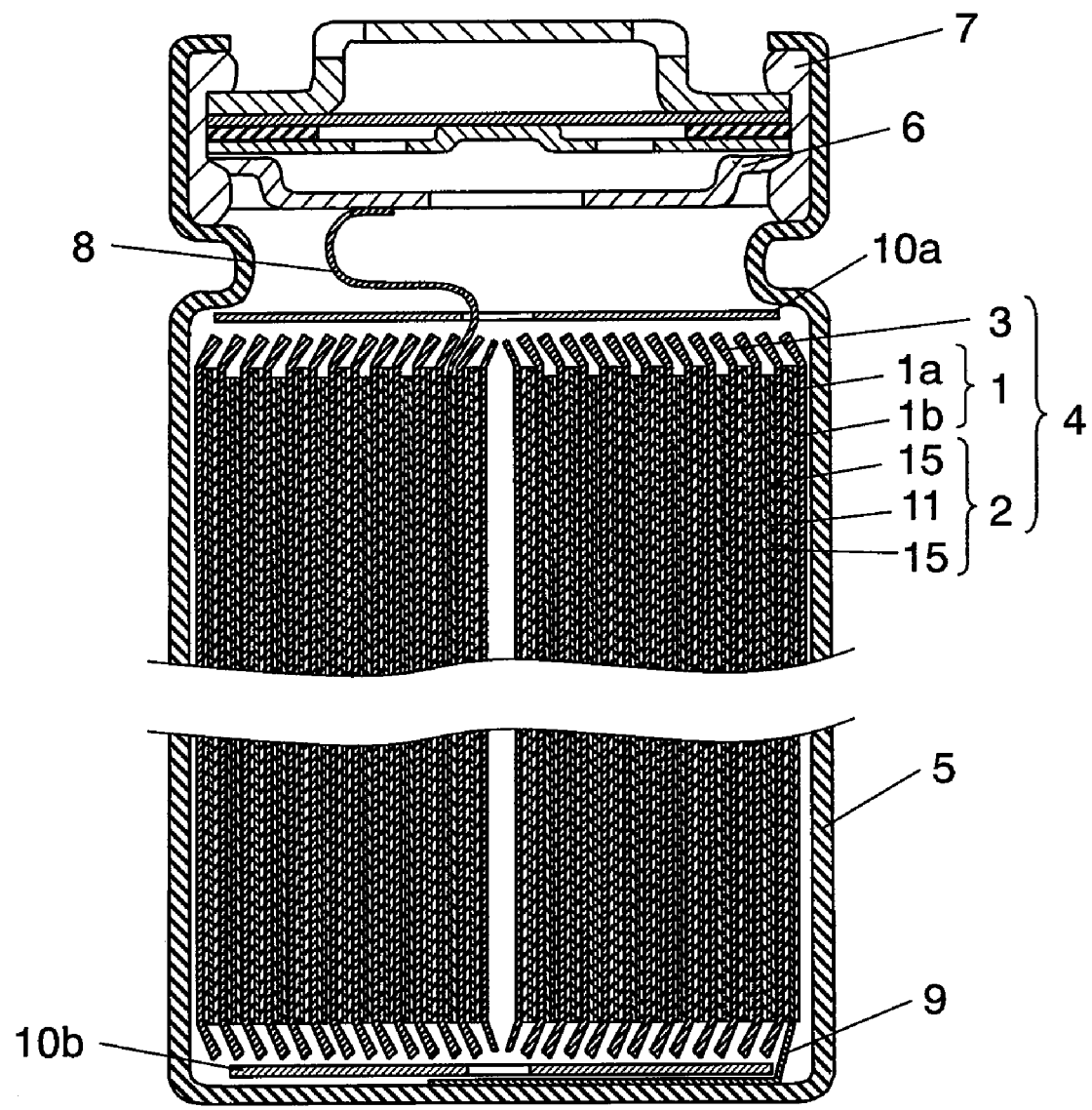
FIG. 1 is a sectional view of a non-aqueous electrolyte secondary battery according to a first exemplary embodiment of the present invention.
Figure 2A:
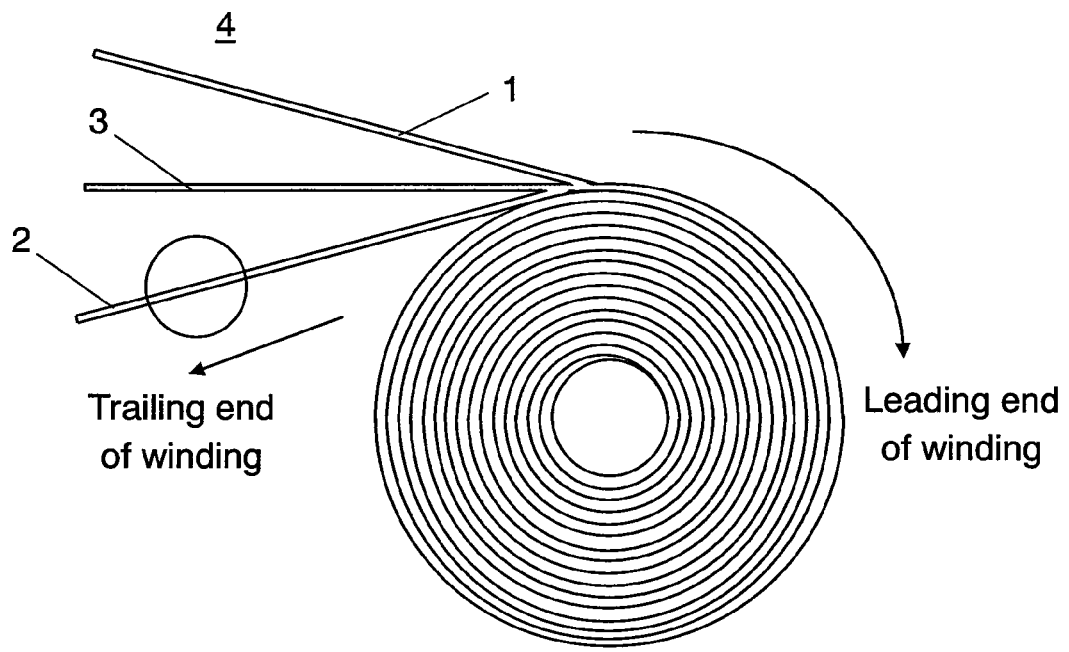
FIG. 2A is a plan view showing schematically a winding state of an electrode group of the non-aqueous electrolyte secondary battery according to the first exemplary embodiment of the invention.
Figure 2B:
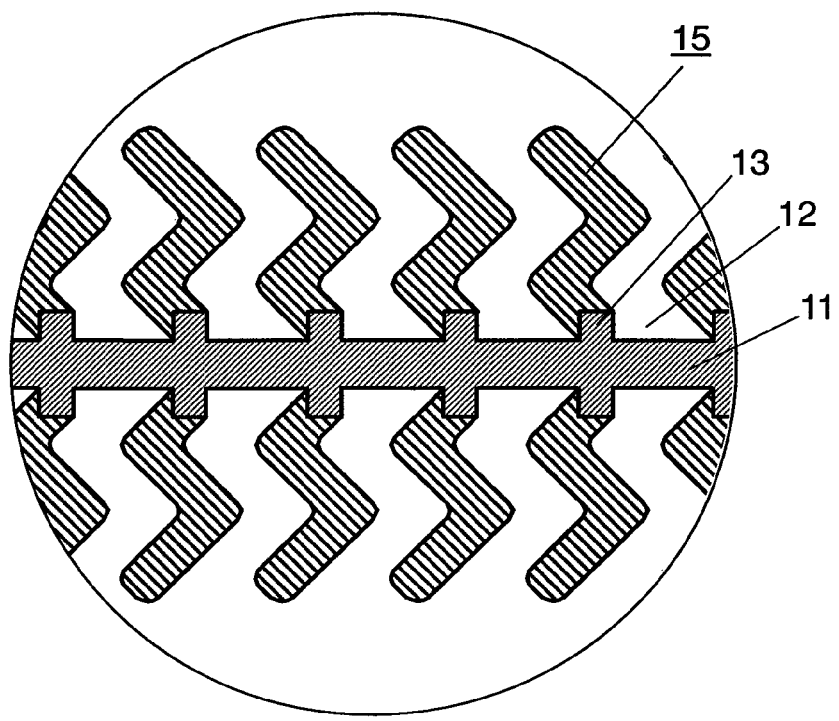
FIG. 2B is a partially enlarged sectional view illustrating a detailed structure of a negative electrode shown in FIG. 2A.

FIG. 1 is a sectional view of a non-aqueous electrolyte secondary battery according to the first exemplary embodiment of the present invention. FIG. 2A is a plan view showing schematically a winding state of an electrode group of the non-aqueous electrolyte secondary battery according to the first exemplary embodiment of the invention, and FIG. 2B is a partially enlarged sectional view illustrating a detailed structure of a negative electrode shown in FIG. 2A.

As shown in FIG. 1, the non-aqueous electrolyte secondary battery of a cylindrical configuration (may be referred to hereinafter as "battery") has electrode group 4 comprising positive electrode 1 made of aluminum, for instance, and provided with positive electrode lead 8, and negative electrode 2 made of copper, for instance, provided with negative electrode lead 9 at one end and disposed in a manner to confront positive electrode 1, wherein positive electrode 1 and negative electrode 2 are wound with separator 3 interposed therebetween, as shown in FIG. 2A. Electrode group 4 is inserted into battery case 5 with insulation plates 10a and 10b attached to the top and bottom of it, one end of positive electrode lead 8 is welded to sealing plate 6, and one end of negative electrode lead 9 is welded to the bottom portion of battery case 5. In addition, a non-aqueous electrolyte (not shown in the figure) capable of conducting lithium ions is injected into battery case 5, and an open end of battery case 5 is crimped to sealing plate 6 with gasket 7 placed between them. Positive electrode 1 is composed of positive electrode current collector 1a and positive electrode mixture layer 1b containing a positive electrode active material.

Description is provided here in brief of negative electrode 2, which will be discussed in greater detail in the later part of this specification. As illustrated in FIG. 2B, negative electrode 2 is comprised of negative electrode current collector 11 (hereinafter referred to as a "current collector") having concave portions 12 and convex portions 13, and columnar bodies 15 formed discretely at least on convex portions 13 in a tilting manner, wherein each of columnar bodies 15 comprises n stages (where n≧2) of columnar body portions overlaid one after another into a zigzag configuration, for example. In this embodiment, tip portions of the columnar body portions at the uppermost stage of the columnar bodies are tilted toward a trailing end of winding direction of electrode group 4 (i.e., to the end of a wound roll). Columnar body portions formed on convex portions 13 of current collector 11 are so composed that a content ratio of the element contained therein varies gradually in a longitudinal direction of the current collector. Furthermore, the columnar body portions overlaid into the n stages (where n≧2) are so formed individually that their content ratios of the element are varied along different directions between odd-number stages and even-number stages.

Here, positive electrode mixture layer 1b includes a lithium-containing complex oxide such as $LiCoO_2$, $LiNiO_2$, $LiMn_2O_4$, or a mixture or a composite compound of these materials as the positive electrode active material. Other materials such as olivine type lithium phosphate expressed by the general formula of $LiMPO_4$ (M represents V, Fe, Ni or Mn) and lithium fluorophosphate expressed by the general formula of $Li_2MPO_4F$ (M represents V, Fe, Ni or Mn) can also be used as the positive electrode active material besides those listed above. In addition, a part of these lithium-containing compounds may be substituted with another element of different kind. The surfaces may be treated with a metallic oxide, a lithium oxide or an electrically conductive agent, or a hydrophobic treatment may also be given.

Positive electrode mixture layer 1b further contains an electrical conductive agent and a binder. The electrical conductive agent can be any material selected from the group consisting of graphites such as natural graphite and artificial graphite, carbon blacks such as acetylene black, ketjen black, channel black, furnace black, lampblack and thermal black, conductive fibers such as carbon fiber and metallic fiber, metal powders such as fluorocarbon and aluminum, conductive whiskers such as zinc oxide and potassium titanate, conductive metal oxides such as titanium oxide, and organic conductive materials such as phenylene derivative.

Materials used as the binder can be any selected from the group consisting of, for example, PVDF, poly-tetrafluoroethylene, polyethylene, polypropylene, aramid resin, polyamide, polyimide, polyamide-imide, polyacrylo-nitrile, polyacrylic acid, polymethyl acrylate ester, polyethyl acrylate ester, polyhexyl acrylate ester, polymethacrylic acid, polymethyl methacrylate ester, polyethyl methacrylate ester, polyhexyl methacrylate ester, polyvinyl acetate, polyvinyl pyrrolidone, polyether, polyether sulfone, hexafluoro polypropylene, styrene-butadiene rubber and carboxymethyl cellulose. Alternatively, a copolymer may be used such as one made of two or more materials selected from the group consisting of tetrafluoro-ethylene, hexafluoro-ethylene, hexafluoro-propylene, perfluoro-alkyl vinyl ether, vinylidene fluoride, chloro-trifluoro ethylene, ethylene, propylene, penta-fluoro propylene, fluoromethyl vinyl ether, acrylic acid and hexadiene. Or, two or more materials selected from the above group can be used by mixing them.

Materials such as aluminum (Al), carbon and a conductive resin are suitable for positive electrode current collector 1a used for positive electrode 1. Any of these materials may be provided additionally with a surface treatment using carbon or the like materials.

Materials applicable to the non-aqueous electrolyte include an electrolytic solution having a solute dissolve in an organic solvent and a so-called poly-electrolyte layer containing electrolytic solution, which is non-fluidized by a polymer. When an electrolytic solution is used, it is desirable to provide at least separator 3 between positive electrode 1 and negative electrode 2 so that separator 3 is impregnated with the electrolytic solution. Separator 3 may consist of one or more layers of unwoven cloth or micro-porous film made of polyethylene, polypropylene, aramid resin, amide-imide, polyphenylene sulfide, polyimide, and the like. In addition, separator 3 may be provided internally or on its surface with a heat-resistant filler such as alumina, magnesia, silica, titania, and the like. It is also appropriate, besides separator 3, to provide a heat-resistant layer composed of any of these heat-resistant fillers and a binder similar to that used for positive electrode 1 and negative electrode 2.

The non-aqueous electrolyte material is selected based on oxidation-reduction potentials and other properties of the individual active materials. The solute desirable for used in the non-aqueous electrolyte is any of salts as generally used for the lithium batteries such as $LiPF_6$, $LiBF_4$, $LiClO_4$, $LiAlCl_4$, $LiSbF_6$, LiSCN, $LiCF_3SO_3$, $LiNCF_3CO_2$, $LiAsF_6$, $LiB_{10}Cl_{10}$, low-grade aliphatic lithium carboxylate, LiF, LiCl, LiBr, LiI, borates such as chloroborane lithium, bis-(1, 2-benzene dioleate (2-)-O,O') lithium borate, bis-(2,3-naphthalene dioleate (2-)-O,O') lithium borate, bis-(2,2'-biphenyl dioleate (2-)-O,O') lithium borate, bis-(5-fluoro-2-olate-1-benzene-sulfonic acid-O,O') lithium borate, or $(CF_3SO_2)_2$NLi, $LiN(CF_3SO_2)(C_4F_9SO_2)$, $(C_2F_5SO_2)_2NLi$ and lithium tetraphenyl borate.

Furthermore, the organic solvent suitable for dissolving the above salts can be any of the solvents as generally used for the lithium batteries such as one or a mixture of two or more materials selected from the group consisting of ethylene carbonate (EC), propylene carbonate, butylene carbonate, vinylene carbonate, dimethyl carbonate (DMC), diethyl carbonate, ethylmethyl carbonate (EMC), dipropyl carbonate, methyl formate, methyl acetate, methyl propionate, ethyl propionate, dimethoxy methane, γ-butyrolactone, γ-valerolactone, 1,2-diethoxy ethane, 1,2-dimethoxy ethane, ethoxymethoxy ethane, trimethoxy methane, tetrahydrofuran derivatives such as tetra-hydrofuran and 2-methyl-tetrahydrofuran, dimethyl sulfoxide, dioxolane derivatives such as 1,3-dioxolane and 4-methyl-1,3-dioxolane, formamide, acetamide, dimethyl formamide, acetonitrile, propyl nitrile, nitromethane, ethyl monoglyme, phosphotriester, acetate ester, propionate ester, sulfolane, 3-methyl sulfolane, 1,3-dimethyl-2-imidazolidinone, 3-methyl-2-oxazolidinone, propylene carbonate derivative, ethyl ether, diethyl ether, 1,3-propane sultone, anisole, fluorobenzene, and the like.

The solvent may also contain additives such as vinylene carbonate, cyclohexyl benzene, biphenyl, diphenyl ether, vinyl ethylene carbonate, divinyl ethylene carbonate, phenylethylene carbonate, diallyl carbonate, fluoro-ethylene carbonate, catechol carbonate, vinyl acetate, ethylene sulfite, propane sultone, trifluoro propylene carbonate, dibenzofuran, 2,4-difluoro anisole, o-terphenyl, m-terphenyl, and the like.

A solid electrolyte may be used as the non-aqueous electrolyte by mixing any of the above solutes with one or a mixture of two or more polymeric materials selected from the group consisting of polyethylene oxide, polypropylene oxide, polyphosphazene, polyaziridine, polyethylene sulfide, polyvinyl alcohol, poly-vinylidene fluoride, polyhexa-fluoropropylene, and the like. Or, the non-aqueous electrolyte can be in a gel form by mixing the solute with the above organic solvent. Moreover, inorganic materials may be used as a solid electrolyte, such as lithium nitride, lithium halogenide, lithium oxoate, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, phosphorus sulfide compound, and the like. When the non-aqueous electrolyte of gel form is used, it can be disposed between positive electrode 1 and negative electrode 2 in place of the separator. Or, the non-aqueous electrolyte of the gel form may be disposed in a manner to adjoin separator 3.

Current collector 11 of negative electrode 2 can be made of such a material as a metal foil of stainless steel, nickel, copper or titanium, or a thin film of carbon or conductive resin. In addition, it may be provided further with a surface treatment with carbon, nickel, titanium or the like material.

The columnar body portions that compose the individual columnar bodies of negative electrode 2 can be formed by using an active material having the property of reversibly inserting and extracting lithium ions and a theoretical capacity density exceeding 833 mAh/cm$^3$, such as silicon (Si) and tin (Sn). Any active material of the above kinds can demonstrate the advantageous effects of the present invention irrespective of whether it is a pure metal, an alloy, a compound, a solid solution, or a complex active material having a silicon-containing material or a tin-containing material. In other words, the silicon-containing material suitable for use can be any of Si, SiOx ($0<x\leq2.0$), or an alloy, a compound or a solid solution of one such material having a part of Si component substituted with at least one element selected from the group consisting of Al, In, Cd, Bi, Sb, B, Mg, Ni, Ti, Mo, Co, Ca, Cr, Cu, Fe, Mn, Nb, Ta, V, W, Zn, C, N and Sn. Some of the tin-containing materials applicable are $Ni_2Sn_4$, $Mg_2Sn$, $SnO_x$ ($0\leq x<2.0$), $SnO_2$, $SnSiO_3$ and LiSnO.

Any of these materials can be used individually, or a plurality of them may be combined to compose the negative electrode active material. A compound containing Si, oxygen and nitrogen, and a composite material composed of a plurality of compounds, all containing Si and oxygen but of different component ratios, are few examples of composing the negative electrode active material with a plurality of different materials listed above.

Referring now to FIGS. 3A, 3B, 4A and 4B, description is provided hereinafter of the negative electrode of the non-aqueous electrolyte secondary battery (hereinafter may simply be referred to as "negative electrode") of the first exemplary embodiment of this invention, as well as performances of the secondary battery equipped with the negative electrode. The following description represents an example using a negative electrode active material (referred to hereinafter as "active material") made of a material that contains at least silicon, as expressed by the formula of SiOx (where $0\leq x\leq2.0$).

Figure 3A:
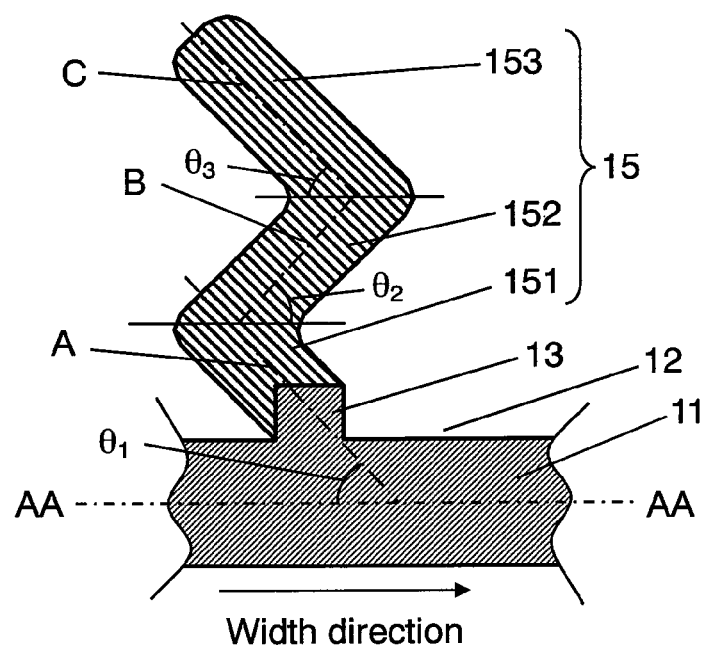
FIG. 3A is a partially sectioned schematic view depicting the structure of the negative electrode according to the first exemplary embodiment of this invention.
Figure 3B:
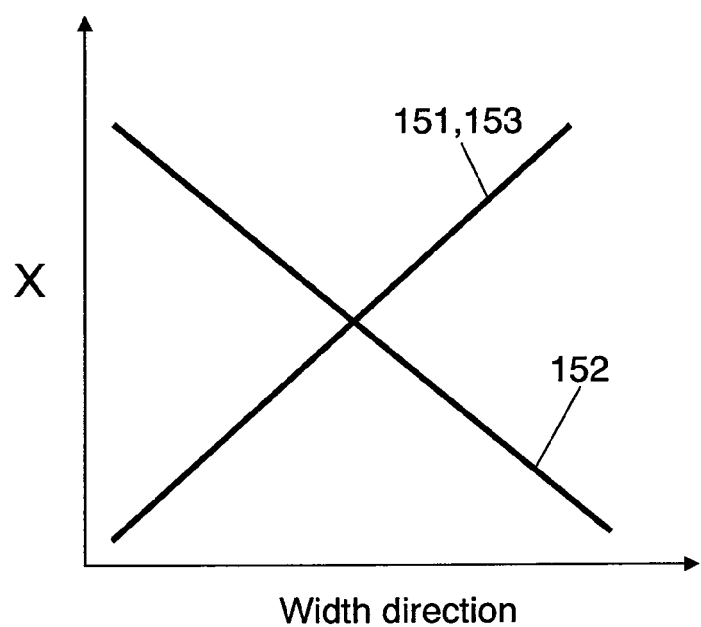
FIG. 3B is a graphic representation explaining variation in a value of x of an active material in a width direction thereof according to the first exemplary embodiment of the invention.
Figure 4A:
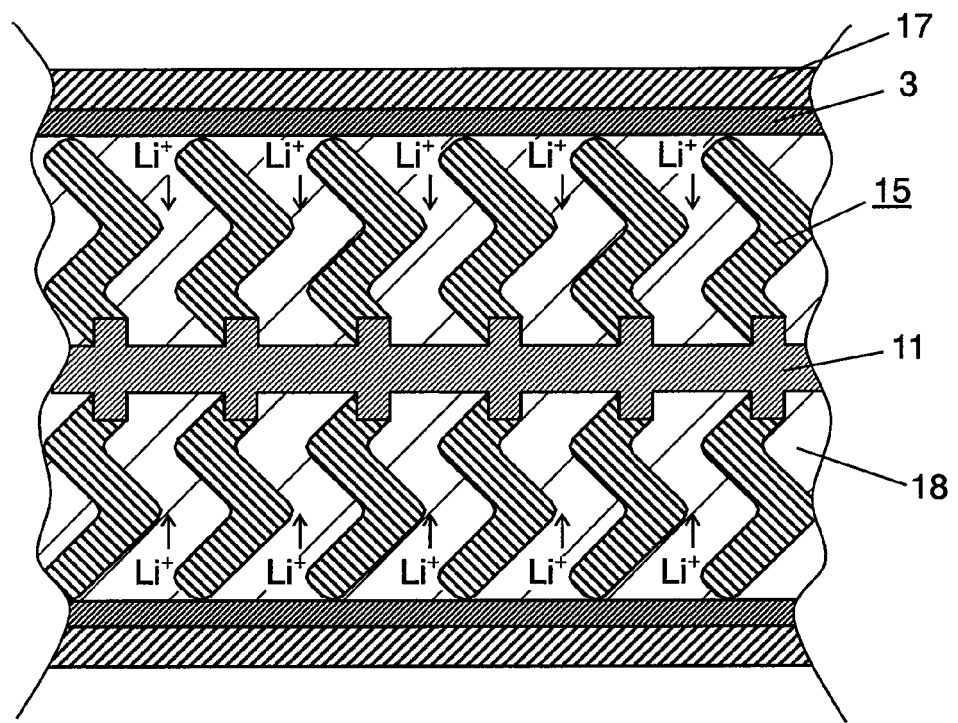
FIG. 4A is a partially sectioned schematic view of the negative electrode employed in the secondary battery according to the first exemplary embodiment of the invention, showing a state before being charged.
Figure 4B:
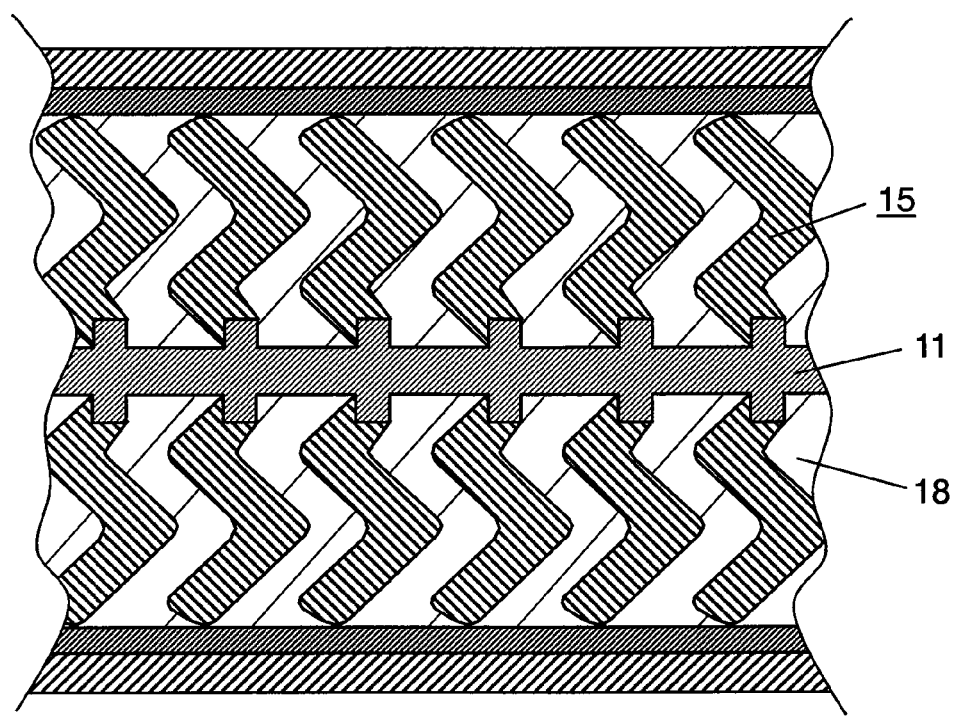
FIG. 4B is a partially sectioned schematic view of the negative electrode employed in the secondary battery according to the first exemplary embodiment of the invention, showing a state after having been charged.

FIG. 3A is a partially sectioned schematic view depicting a structure of the negative electrode according to the first exemplary embodiment of this invention, and FIG. 3B is a graphic representation explaining variation in a value of x of an active material in a width direction thereof according to this exemplary embodiment. FIG. 4A is a partially sectioned schematic view of the negative electrode employed in the secondary battery according to the first exemplary embodiment of the invention, showing a state before the battery is charged, and FIG. 4B is a partially sectioned schematic view of the negative electrode employed in the secondary battery according to this exemplary embodiment, showing a state after the battery have been charged.

As shown in FIG. 3A, current collector 11 made of a conductive metal material such as a copper (Cu) foil, for instance, is provided with concave portions 12 and convex portions 13 at least in its upper surface. There are columnar bodies 15 formed on the top portions of convex portions 13 with an active material composing negative electrode 2 and expressed by the formula of SiOx, which is deposited by using an oblique vapor deposition technique such as sputtering or vacuum deposition method, for example, in a manner that each of columnar bodies 15 comprises n stages (where n=3) of columnar body portions in a tilting manner. In this instance, columnar body 15 is formed of a plurality of the columnar body portions into a zigzag configuration.

The embodiment herein described concretely is an example of columnar body 15 composed of three stages, i.e., n=3, of overlaid columnar body portions 151, 152 and 153. However, this is not restrictive and that the "stage n" can be of any integral number not smaller than 2.

First, columnar body portion 151 of columnar body 15 is formed at least on the top portion of convex portion 13 on current collector 11 so that the center line (A) in a tilting orientation of columnar body portion 151 and a plane (AA-AA) of current collector 11 form a crossing angle $\theta_1$ (hereinafter referred to as "tilting angle"). Columnar body portion 152 of columnar body 15 is then formed on top of columnar body portion 151 so that the center line (B) along its tilting orientation and the plane (AA-AA) of current collector 11 form a tilting angle $\theta_2$. Furthermore, columnar body portion 153 of columnar body 15 is formed on top of columnar body portion 152 so that the center line (C) along its tilting orientation and the plane (AA-AA) of current collector 11 form another tilting angle $\theta_3$. Here, the tilting angles $\theta_1$, $\theta_2$ and $\theta_3$ can be same angle or different angles so long as the adjoining columnar bodies 15 do not come in contact with each other. In certain instances below, an obtuse angle formed between the plane of the current collector and the central line of the columnar body portions at one side may be referred to by a general term of "tilting angle $\theta$".

Columnar body portions 151, 152 and 153 composing columnar body 15 are so formed that, for example, a value of x in content ratio of the element contained therein varies in the width direction of each of them, but in different directions between odd-number stage columnar body portions 151 and 153 and even-number stage columnar body portion 152, as shown graphically in FIG. 3B. In other words, the value of x of the element contained in each of columnar body portions 151, 152 and 153 is increased gradually from one side of the tilting angle forming an acute angle toward the other side forming an obtuse angle. Although FIG. 3B shows that the value of x varies linearly, it is illustrative and not restrictive. In this embodiment, the width direction defines a direction of winding of negative electrode 2 or a longitudinal direction of the current collector.

Columnar bodies 15 formed on convex portions 13 of current collector 11 in the three tilted stages of zigzag configuration expand in their volumes due to insertion of lithium ions when the non-aqueous electrolyte secondary battery is electrically charged. In this case, columnar bodies 15 deform in a manner to rise upright, for example, as a result of the increase in the tilting angles $\theta_1$, $\theta_2$ and $\theta_3$ of columnar body portions 151, 152 and 153 of columnar bodies 15 with the expansion of their volumes, as will be discussed in detail of the mechanism by referring to FIG. 6A and FIG. 6B in the latter section. When discharged, on the contrary, the tilting angles $\theta_1$, $\theta_2$ and $\theta_3$ decrease and columnar bodies 15 return close to their initial zigzag configuration as their volumes contract due to extraction of the lithium ions, as shown in FIG. 4A.

At the start of charging, columnar bodies 15 having the three stages of the columnar body portions are uprightly tilted on convex portions 13 of current collector 11 in such shapes that they partially cover concave portions 12 in current collector 11 when columnar bodies 15 are observed in a projected plane from the side of positive electrode 17, as is shown in FIG. 4A. This structure can therefore prevent deposition of lithium metal since lithium ions extracted from positive electrode 17 during a charging process are interfered with by columnar bodies 15 of the negative electrode, and most of the lithium ions are inserted by columnar bodies 15 instead of reaching directly to concave portions 12 in current collector 11. The tilting angles of the three stages of the columnar body portions increase with insertion of the lithium ions. It is desirable to design the columnar bodies so that their tilting angles become 90° when the battery is fully charged, although the tilting angles may be smaller than 90° for the columnar bodies to remain in the zigzag configuration.

Columnar bodies 15 comprising the three stages of the columnar body portions are in their upright state above current collector 11 when the battery is fully charge, as shown in FIG. 4B. Under this condition, electrolyte 18 retained around the adjoining columnar bodies 15 is easily movable in the spaces formed around them when the fully charged battery is discharged. The movement of lithium ions are therefore not disturbed since electrolyte 18 around the adjoining columnar bodies 15 flows freely by convection in the spaces around them. As a result, this structure can significantly improve characteristics of high-rate discharge as well as low-temperature discharge.

Here, the fully charged columnar bodies 15 expand due to the insertion of lithium ions, and subjected to stresses in the direction of thickness of the electrode.

In the case of the conventional structure having a single stage of tilted columnar bodies, the stresses tend to concentrate on junctions between convex portions 13 of current collector 11 and columnar bodies 15, and they function as moments of force to separate the junctions. There was also a drawback that the expansion of the columnar bodies causes the electrode group to deform in a manner to relieve the stresses built up therein since the outer dimensions of the electrode group are restricted by battery case 5.

In this regard, use of the negative electrode of the first exemplary embodiment of this invention can provide an advantageous effect to the deformation in shape of the electrode group, which is described with reference to FIG. 5.

Figure 5:
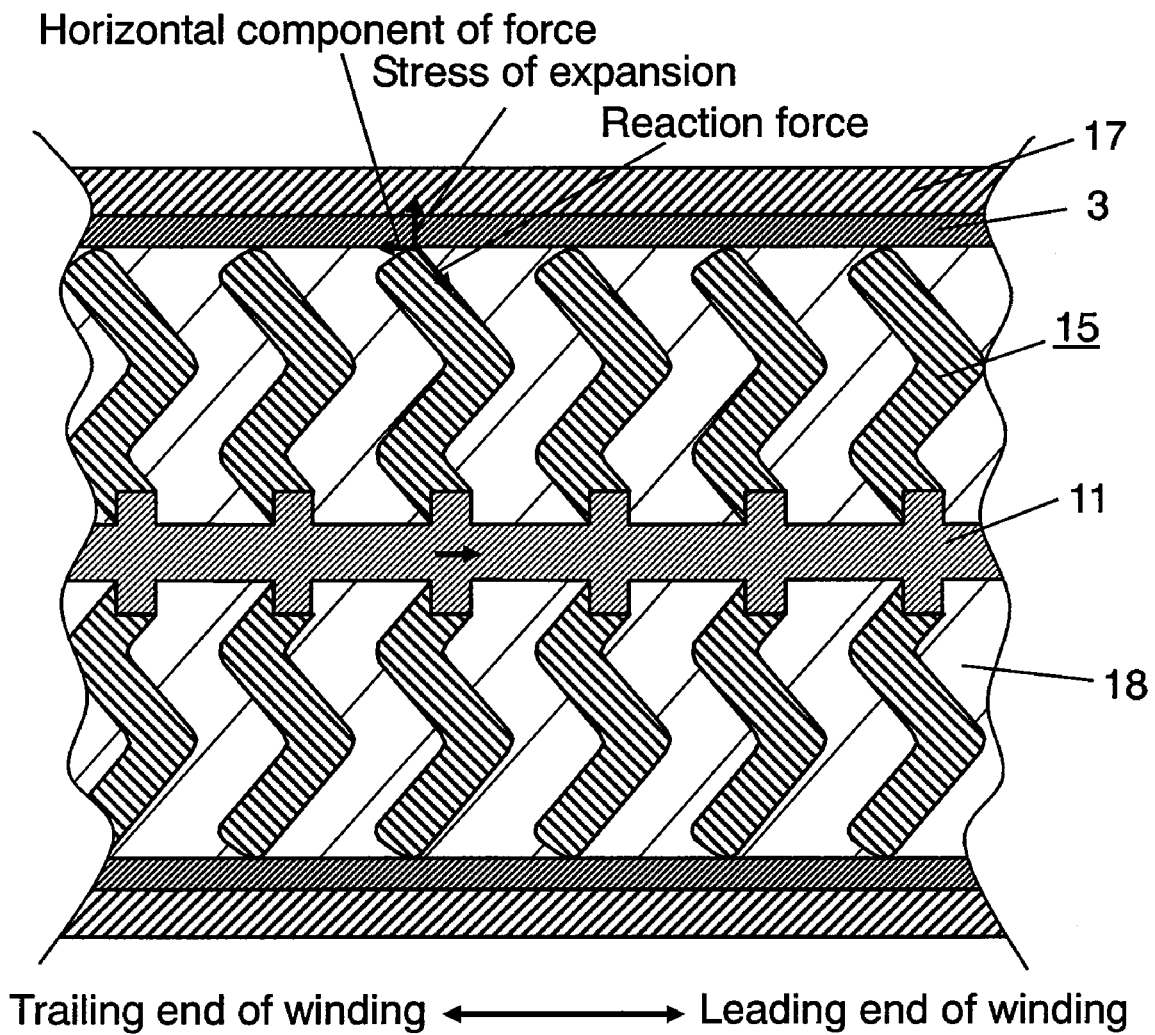
FIG. 5 is an explanatory view showing an effect on changes in shape of the electrode group as achieved by employing the negative electrode of the first exemplary embodiment of the invention.

As shown by arrows in FIG. 5, an expanding stress produced by the expansion of columnar bodies 15 and exerted on separator 3 and positive electrode 1 is divided into a horizontal component force and a reaction force, which is impressed upon the columnar bodies.

In other words, columnar bodies 15 of the negative electrode in contact with separator 3 of electrode group 4 impress the expanding stress upon separator 3, and receives the reaction force by themselves. However, such reaction force is absorbed by a spring effect of the flexible bent portions in the zigzag configuration of the columnar body portions as well as their structure contrived to have a small moment (i.e., reduced in length of the columnar body portions) to alleviate concentration of the stress on the junctions. There is thus achieved the non-aqueous electrolyte secondary battery of excellent reliability and cycle characteristics, and not liable to separation and deformation.

On the other hand, the negative electrode of the electrode group shifts toward the leading end of the winding direction by the horizontal component force impressed by the expanding stress of the columnar bodies. This action of the expanded negative electrode tightens winding of the electrode group in a manner to cancel out the expansion of the negative electrode by the tightening action to thereby reduce the change in the dimensions. Accordingly, this embodiment can reduce deformation of the electrode group. Furthermore, the embodiment allows the electrode group to be of substantially the same size as the inner diameter of the battery case, while also reducing the changes in size of the electrode group attributable to insertion and extraction of lithium ions. This structure can prevent the electrode group from moving relative to the battery case when the second battery is dropped or subjected to impacts, thereby achieving the non-aqueous electrolyte secondary battery of high reliability.

Figure 6A:
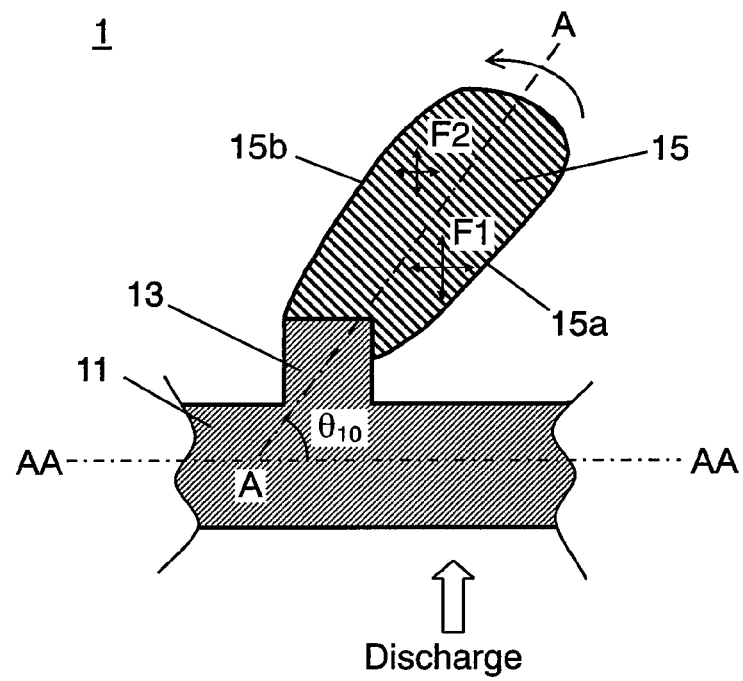
FIG. 6A is a partially sectioned schematic view of a columnar body of the negative electrode according to the first exemplary embodiment of the invention, showing a state before being charged.
Figure 6B:
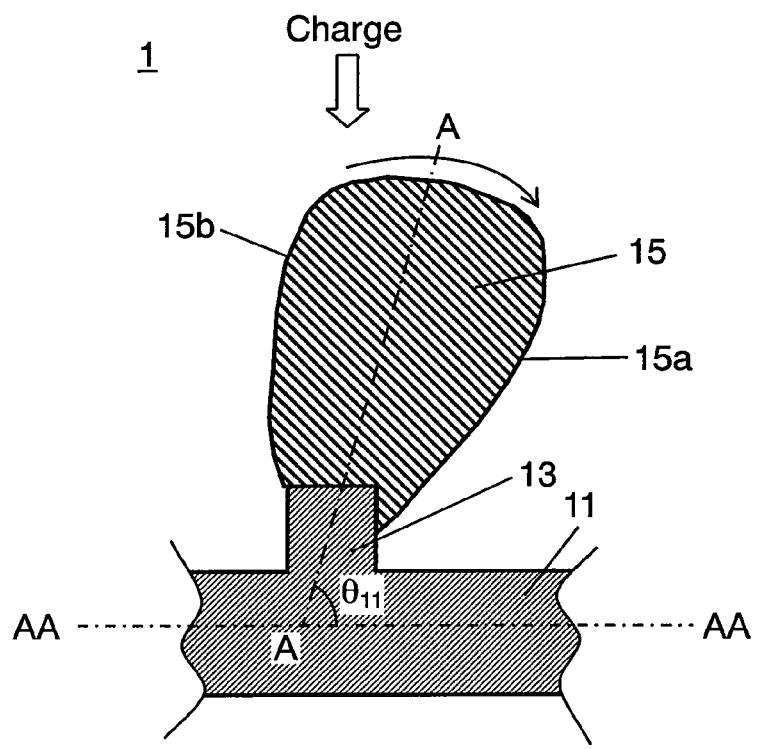
FIG. 6B is a partially sectioned schematic view of the columnar body of the negative electrode according to the first exemplary embodiment of the invention, showing a state after having been charged.

Referring to FIG. 6A and FIG. 6B, description is provided hereinafter of the mechanism that reversibly changes the tilting angle of columnar bodies 15 responsive to insertion and extraction of the lithium ions. Although the invented structure has the columnar body composed of n stages of the columnar body portions, the following description is simplified by giving an example, in which each columnar body is composed of single stage. However, the columnar body composed of n stages can also function in the same mechanism as the single-stage columnar body portion.

FIG. 6A is a partially sectioned schematic view of the columnar body of the negative electrode according to the first exemplary embodiment of the invention, showing a state before the battery is charged, and FIG. 6B is a partially sectioned schematic view of the columnar bodies of the same exemplary embodiment, showing another state after the battery has been charged.

Columnar body 15 shown in the FIG. 6A and FIG. 6B is so formed that the content ratio of the oxygen element contained in the active material composed of SiOx is varied in a manner that the value of x increases continually from lower side 15a of columnar body 15, where the center line (A-A) of columnar body 15 and the plane (AA-AA) of current collector 11 form an acute angle, toward upper side 15b of columnar body 15, where they form an obtuse angle, as shown in FIG. 3B. The active material composed of SiOx has such a property that a degree of expansion caused by the insertion of lithium ions becomes smaller as the value of x increases from 0 to 2.

In other words, the expanding stress produced by the expansion of columnar body 15 attributed to insertion of lithium ions during the charging process decreases continually from a value F1 in lower side 15a toward another value F2 in upper side 15b, as shown in FIG. 6A. As a consequence, the tilting angle θ formed between the center line (A-A) of columnar body 15 and the plane (AA-AA) of current collector 11 changes from angle $θ_{10}$ to angle $θ_{11}$, such that columnar body 15 rises up in the direction shown by an arrow in FIG. 6A. On this contrary, the expanding stresses decrease during the discharging process due to contraction caused by extraction of the lithium ions. Consequently, the tilting angle θ of columnar body 15 changes from angle $θ_{11}$ to angle $θ_{10}$, so that columnar body 15 deforms in the direction shown by an arrow in FIG. 6B.

As discussed above, columnar bodies 15 change their tilting angle reversibly due to insertion and extraction of the lithium ions.

Referring to FIG. 7A to FIG. 7D and FIG. 8, description is provided hereinafter of a method of manufacturing the columnar bodies on the negative electrode for the non-aqueous electrolyte secondary battery according to the first exemplary embodiment of this invention.

Figure 7A:
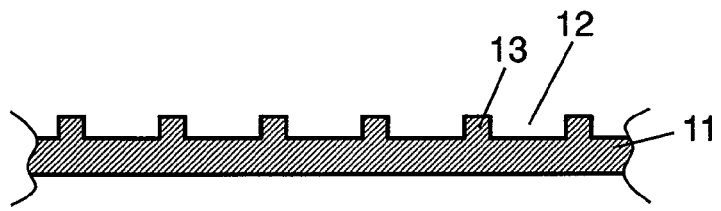
FIG. 7A is a partially sectioned schematic view of the negative electrode of the non-aqueous electrolyte secondary battery according to the first exemplary embodiment of the invention, illustrating a process of forming the columnar bodies, each consisting of three stages (n=3) of columnar body portions.
Figure 7B:
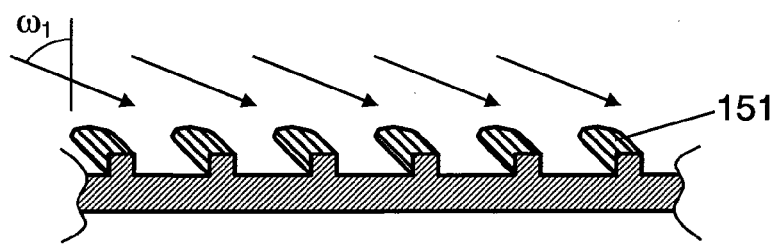
FIG. 7B is another partially sectioned schematic view of the negative electrode of the non-aqueous electrolyte secondary battery according to the first exemplary embodiment of the invention, illustrating the process of forming the columnar bodies, each consisting of three stages (n=3) of the columnar body portions.
Figure 7C:
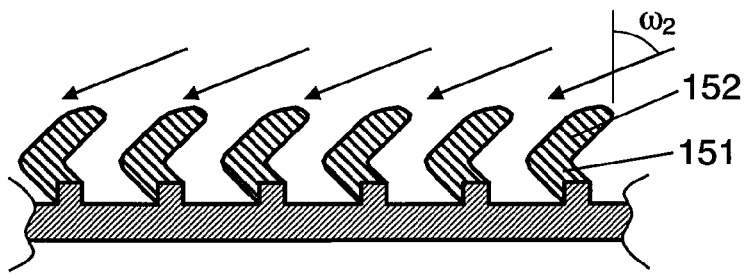
FIG. 7C is still another partially sectioned schematic view of the negative electrode of the non-aqueous electrolyte secondary battery according to the first exemplary embodiment of the invention, illustrating the process of forming the columnar bodies, each consisting of three stages (n=3) of the columnar body portions.
Figure 7D:
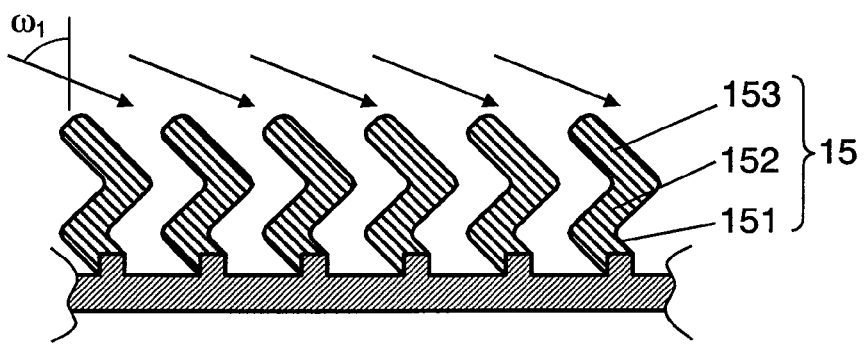
FIG. 7D is yet another partially sectioned schematic view of the negative electrode of the non-aqueous electrolyte secondary battery according to the first exemplary embodiment of the invention, illustrating the process of forming the columnar bodies, each consisting of three stages (n=3) of the columnar body portions.
Figure 8:
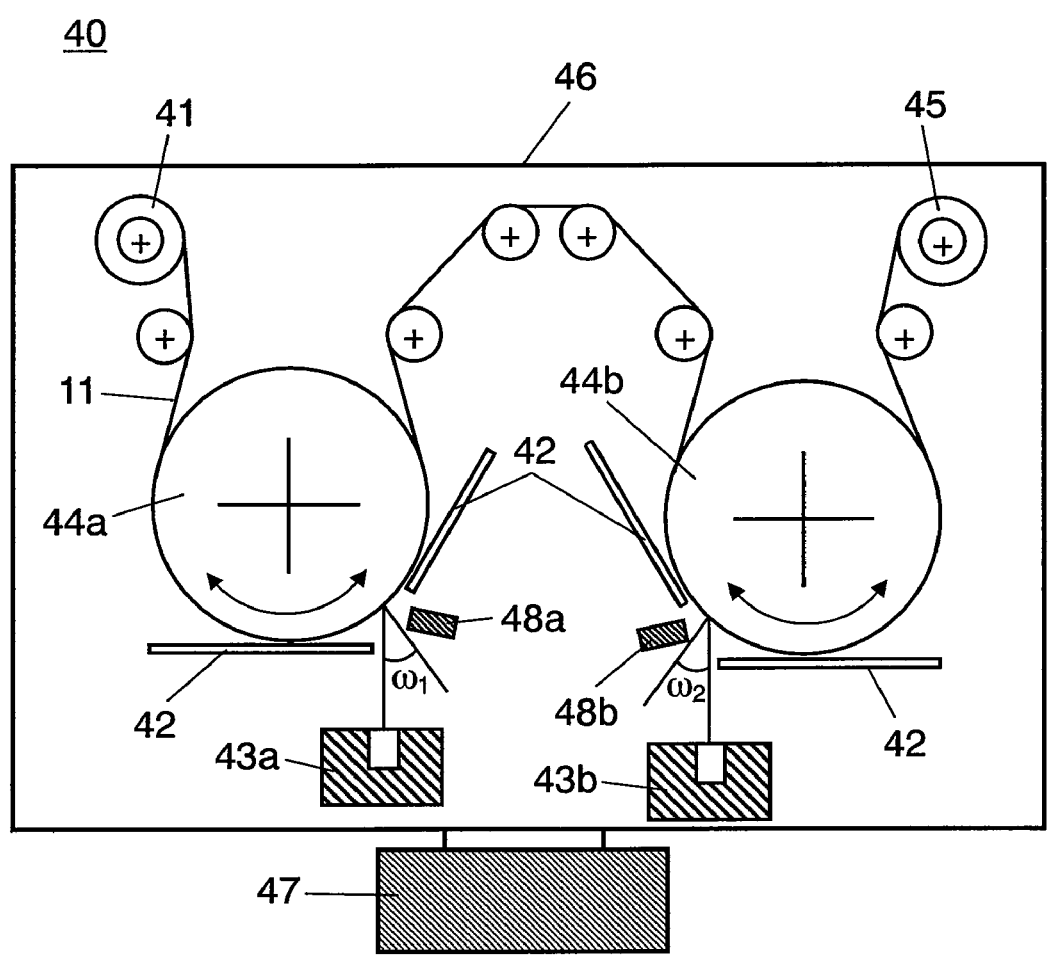
FIG. 8 is a schematic drawing illustrating a manufacturing apparatus used to form the columnar bodies consisting of three stages (n=3) of the columnar body portions on the negative electrode of the non-aqueous electrolyte secondary battery according to the first exemplary embodiment of the invention.

FIG. 7A to FIG. 7D are partially sectioned schematic views of the negative electrode of the non-aqueous electrolyte secondary battery, illustrating the process of forming the columnar bodies, each consisting of n stages, or n=3, of columnar body portions according to the first exemplary embodiment of the invention, and FIG. 8 is a schematic drawing illustrating a manufacturing apparatus used.

Manufacturing apparatus 40 shown in FIG. 8 for forming the columnar bodies has a structure comprising release/take-up reel 41, deposition rollers 44a and 44b, take-up/release reel 45, deposition sources 43a and 43b, masks 42 and oxygen nozzles 48a and 48b inside vacuum chamber 46, which is decompressed by vacuum pump 47. Though manufacturing apparatus 40 shown here represents an example for making columnar bodies by forming n stages of columnar body portions on one surface of the current collector, the actual apparatus generally has a structure capable of making the columnar bodies on both surfaces of the current collector.

First, concave portions 12 and convex portions 13 are formed by a plating method on a surface of a band-like electrolytic copper foil having 30 μm in thickness to prepare current collector 11, as shown in FIG. 7A and FIG. 8. Convex portions 13 in this instance are formed into a height of 5 μm and a width of 10 μm at intervals of 20 μm. Current collector 11 is set between release/take-up reel 41 and take-up/release reel 45 shown in FIG. 8.

Next, using a deposition unit (i.e., a unit assembled with a deposition source, a crucible pot and an electron beam generator), an active material such as Si (e.g., scrap silicon of a 99.999% purity) is evaporated and emitted from deposition source 43a provided in a position at an angle of $\omega_1$ (e.g., 55°) with respect to a direction of the normal of current collector 11 toward the top of each convex portion 13 on current collector 11 from a direction indicated by an arrow as shown in FIG. 7B and FIG. 8. During this process, oxygen ($O_2$) is supplied from oxygen nozzle 48a toward current collector 11. When this is the case, the inside of vacuum chamber 46 is kept at a pressure of 3.5 Pa of oxygen atmosphere, for example. Oxygen nozzle 48a is disposed in a different position from deposition source 43a. An active material of SiOx is formed by combination of Si and oxygen in a film-forming area, which is bounded by mask 42 on current collector 11 supplied to deposition roller 44a, so that a first stage of columnar body portion 151 is formed into a predetermined height (or thickness) of 7 μm, for instance, at an angle of $\theta_1$ on the top portion of convex portion 13. In this process, columnar body 15 is so formed that a value of x of the compound SiOx varies continually along the moving direction of current collector 11 according to a position of convex portion 13 on current collector 11 relative to deposition source 43a and oxygen nozzle 48a. In the example shown in FIG. 7B, the value of x becomes smaller at the left side of the drawing, and the value of x increases toward the right side of it.

In the next step, current collector 11 having the first stage of columnar body portion 151 formed on convex portion 13 is advanced to a subsequent position on deposition roller 44b as shown in FIG. 7C and FIG. 8. Using another deposition unit (i.e., a unit assembled with a deposition source, a crucible pot and an electron beam generator) disposed in a position facing deposition roller 44b, an active material such as Si (e.g., scrap silicon of a 99.999% purity) is evaporated and emitted from deposition source 43b provided in a position at an angle of $\omega_2$ (e.g., 55°) with respect to the direction of the normal of current collector 11 toward the first stage of columnar body portion 151 on current collector 11 from a direction indicated by an arrow in the figure. During this process, oxygen nozzle 48b is disposed in a different position from deposition source 43b. An active material of SiOx is formed by combination of Si and oxygen in a film-forming area, which is bounded by mask 42 on current collector 11 supplied to deposition roller 44b, so that a second stage of columnar body portion 152 is formed into a predetermined height (or thickness) of 7 μm, for instance, at an angle of $\theta_2$ on top of the first stage of columnar body portion 151. In this process, second stage of columnar body portion 152 is formed in the like manner as the first stage of columnar body portion 151, so that a value of x of the compound SiOx varies continually along the moving direction of current collector 11 according to a position of the first stage of columnar body portion 151 on current collector 11 relative to deposition source 43b and oxygen nozzle 48b. In the second stage of columnar body portion 152 shown in FIG. 7C, the value of x becomes smaller at the right side of the drawing, and the value of x increases toward the left side of it. As a result of the above steps, the first stage of columnar body portion 151 and the second stage of columnar body portion 152 are formed with their values of x varied along directions opposite of the moving directions of the current collector, and in different tilting angles and tilting orientations with respect to each other.

Subsequently, as shown in FIG. 7D and FIG. 8, current collector 11 having the second stage of columnar body portion 152 formed thereon is returned to the previous position on deposition roller 44a by driving release/take-up reel 41 and take-up/release reel 45 in reverse, and a third stage of columnar body portion 153 is formed into a predetermined height (or thickness) of 7 μm, for instance, on top of the second stage of columnar body portion 152 in the same manner as the step taken in FIG. 7B. In the third stage of columnar body portion 153 shown in FIG. 7D, the value of x becomes smaller at the left side of the drawing, and the value of x increases toward the right side of it. As a result, the second stage of columnar body portion 152 and the third stage of columnar body portion 153 are formed with their values of x varied along directions opposite of the moving directions of the current collector, and in different tilting angles and tilting orientations with respect to each other. In the case discussed above, the first stage of columnar body portion 151 and the third stage of columnar body portion 153 are formed in the same orientation. Accordingly, there is provided a negative electrode having columnar body 15 comprised of three stages of the columnar body portions formed thereon.

In the above embodiment, although what has been described is an example, in which columnar bodies 15 are composed of the columnar body portions of three stages, i.e., n=3, this is not restrictive. For instance, the columnar bodies composed of any number of stages (n≧2) of the columnar body portions can be formed by repeating the steps shown above in FIG. 7C to FIG. 7D.

Manufacturing apparatus 40 described above represents one example, in which the individual columnar bodies are produced by reversing release/take-up reel 41 and take-up/release reel 45. However, apparatuses of various structures are also adoptable other than the above. For example, the apparatus shown in FIG. 8 may be provided with a plurality of deposition rollers in series so that columnar bodies of n stages are formed while moving the current collector in one direction.

Though the above embodiment represents an example showing the columnar bodies formed on one surface of the current collector, the actual practice is to form the columnar bodies on both surfaces of the current collector. In a such application, the structure of the manufacturing apparatus can be so altered that columnar bodies are formed on one of the surfaces of the current collector after completing columnar bodies on the other surface, or the columnar bodies may be formed simultaneously on both surfaces. In this way, the negative electrode can be produced highly productivity.

Second Exemplary Embodiment

Figure 9A:
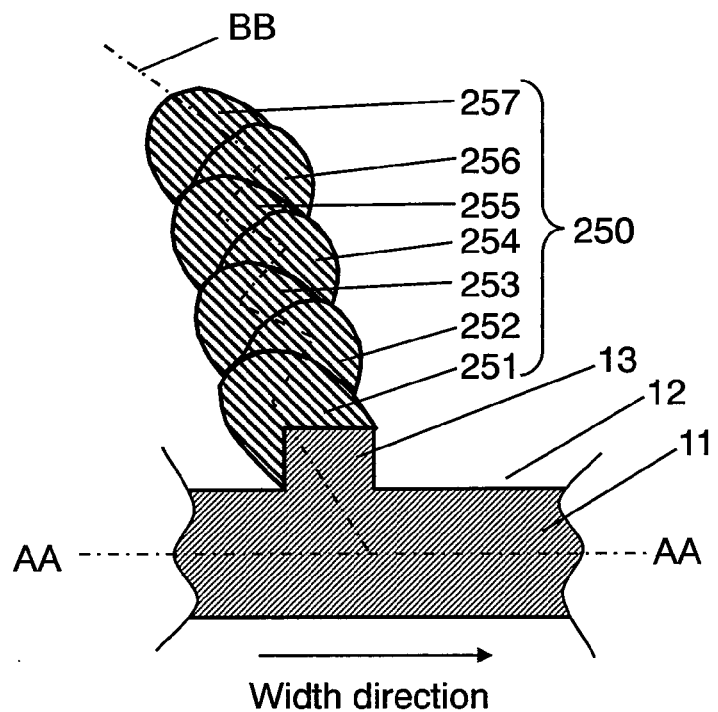
FIG. 9A is a partially enlarged sectional view showing a structure of a negative electrode according to a second exemplary embodiment of the present invention.
Figure 9B:
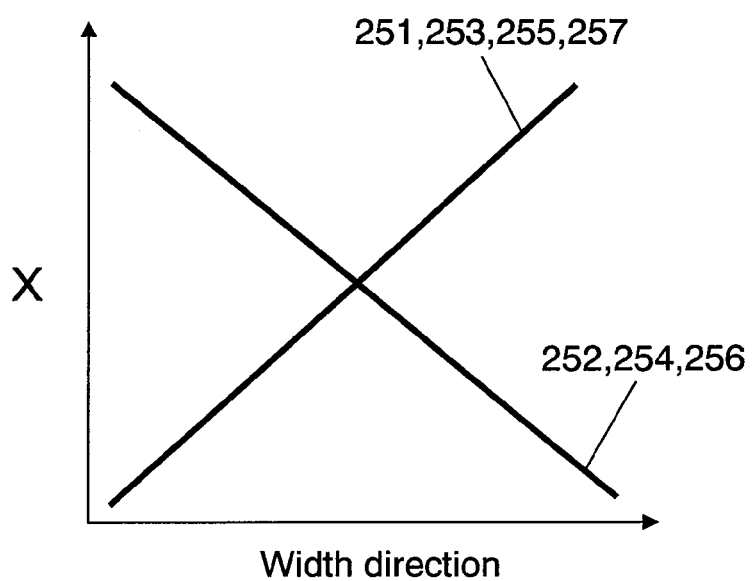
FIG. 9B is a graphic representation explaining variation in a value of x of an active material composing individual columnar body portions in a width direction thereof according to the second exemplary embodiment of the invention.

FIG. 9A is a partially enlarged sectional view showing a structure of a negative electrode according to the second exemplary embodiment of the present invention, and FIG. 9B is a graphic representation explaining variation in a value of x of an active material composing individual columnar body portions in a width direction thereof according to the second exemplary embodiment of the invention. A battery of cylindrical configuration used in the present embodiment is similar to the one shown in FIG. 1, and detailed description shall therefore be omitted here. Likewise, detailed description shall also be omitted for other members having the same structures and materials as those of the first exemplary embodiment such as the positive electrode mixture layer, positive electrode current collector, negative electrode current collector, columnar body, and the like.

The present exemplary embodiment differs from that of the first exemplary embodiment in respect of that the entire columnar bodies comprised of seven stages, or n=7, of columnar body portions are formed on convex portions of the current collector in a tilting orientation toward the trailing end of winding direction of the negative electrode.

In other words, current collector 11 made of a conductive metal material such as a copper (Cu) foil, for instance, is provided with concave portions 12 and convex portions 13 in at least an upper surface thereof, as shown in FIG. 9A. There are columnar bodies 250 formed on the top portions of convex portions 13 with an active material expressed by the formula of SiOx, which is deposited by using an oblique vapor deposition technique such as sputtering or vacuum deposition method, for example, in a manner that each of columnar bodies 250 has a configuration comprising n stages (e.g., n≧2) of columnar body portions in an overlapping form. In the example shown in FIG. 9A, columnar bodies 250 is formed of columnar body portions 251 to 257, which are overlapped one after another into seven stages (n=7). Here, the columnar body portions of the odd-number stages and the even-number stages composing columnar bodies 250 are formed in different orientations as shown by the line BB in FIG. 9A, but they are all tilted in the same orientation toward the trailing end of winding direction. In this process, columnar body 250 can be tilted entirely by forming the columnar body portions into different heights between the odd-number stages and the even-number stages. In the case of the example shown in FIG. 9A, the height of columnar body portions 251, 253, 255 and 257 of the odd-number stages is set larger than that of columnar body portions 252, 254 and 256 of the even-number stages, for instance, in order to tilt columnar body 250 toward the trailing end of winding. With this structure, columnar body 250 in its entirety including columnar body portion 257 at the tip end is formed in the manner to tilt to the trailing end of winding, as shown by the line BB in FIG. 9A.

In addition, columnar body portions 251 to 257 composing columnar body 250 are so formed that, for example, a value of x in content ratio of the element contained therein varies in the width direction of each of them, but in different directions between odd-number stage columnar body portions 251, 253, 255 and 257 and even-number columnar body portions 252, 254 and 256 as shown graphically in FIG. 9B. In other words, the value of x of the element contained in each of columnar body portions 251 to 257 is increased gradually from one side of the tilting angle forming an acute angle toward the other side forming an obtuse angle. Although FIG. 9B shows that the value of x varies linearly, it is illustrative and not restrictive.

Figure 10A:
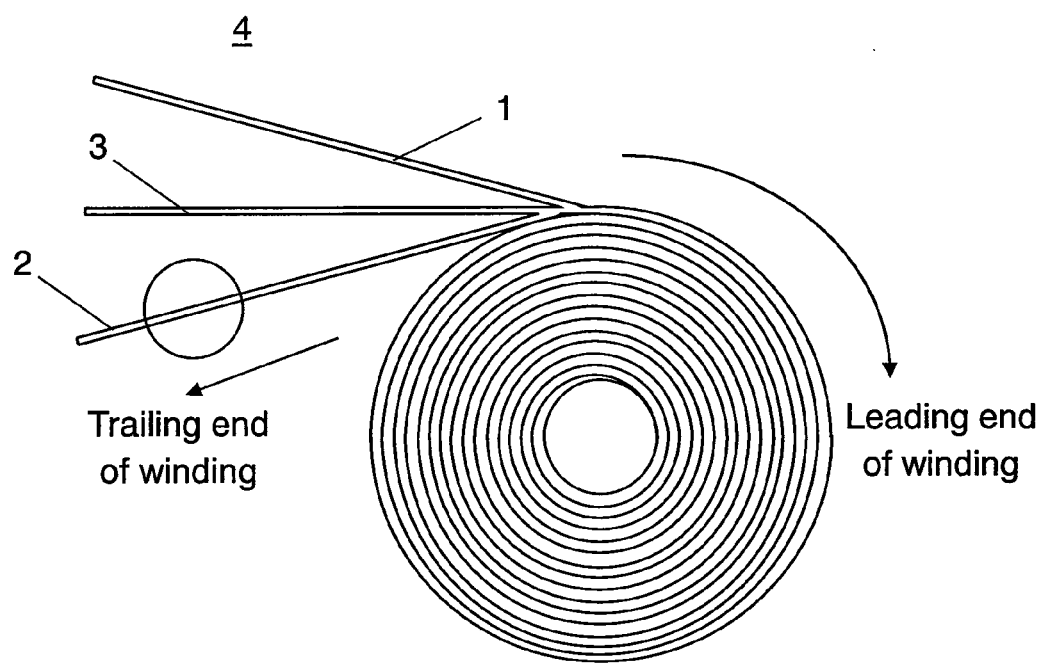
FIG. 10A is a plan view showing schematically a winding state of an electrode group of the non-aqueous electrolyte secondary battery according to the second exemplary embodiment of the invention.
Figure 10B:
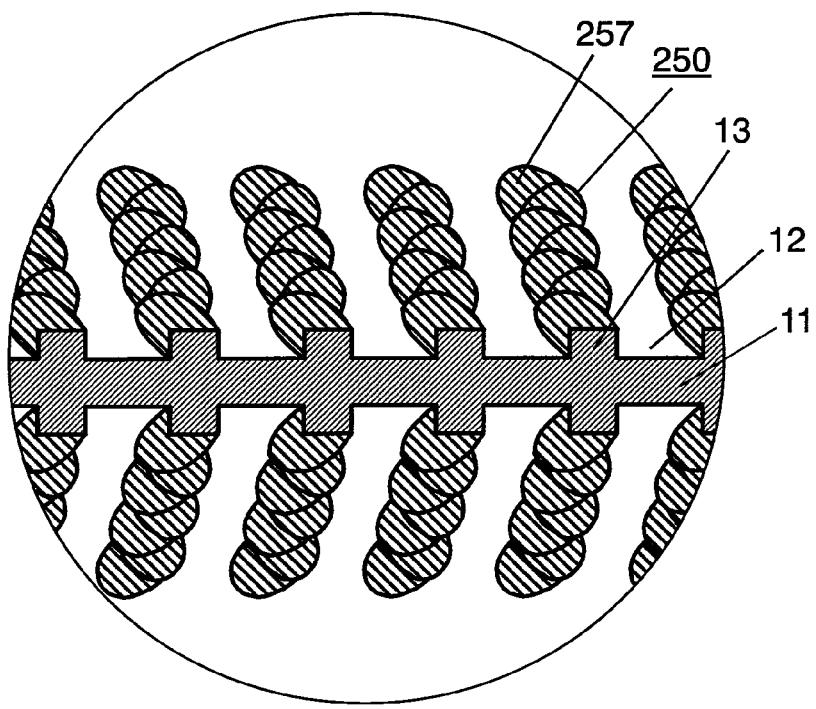
FIG. 10B is a partially enlarged sectional view illustrating a detailed structure of the negative electrode shown in FIG. 10A.

Description is provided of the electrode group of the non-aqueous electrolyte secondary battery employing the negative electrode of the above structure with reference to FIG. 10A and FIG. 10B. The description will be given briefly here since the electrode group is basically similar to that of the first exemplary embodiment shown in FIG. 2A and FIG. 2B.

Figure 11A:
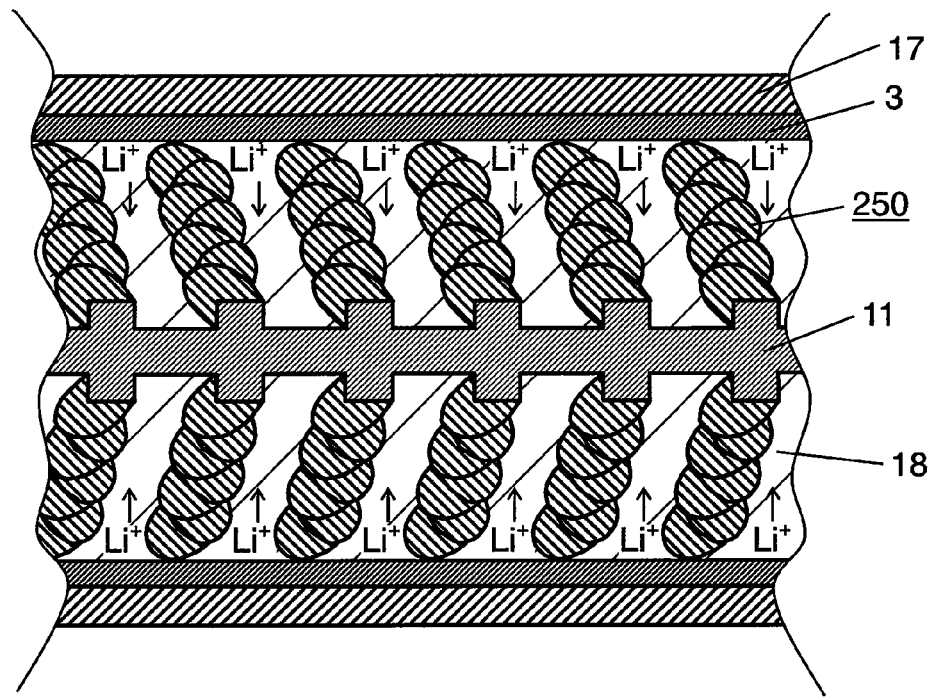
FIG. 11A is a partially sectioned schematic view of the negative electrode employed in the secondary battery according to the second exemplary embodiment of the invention, showing a state before being charged.
Figure 11B:
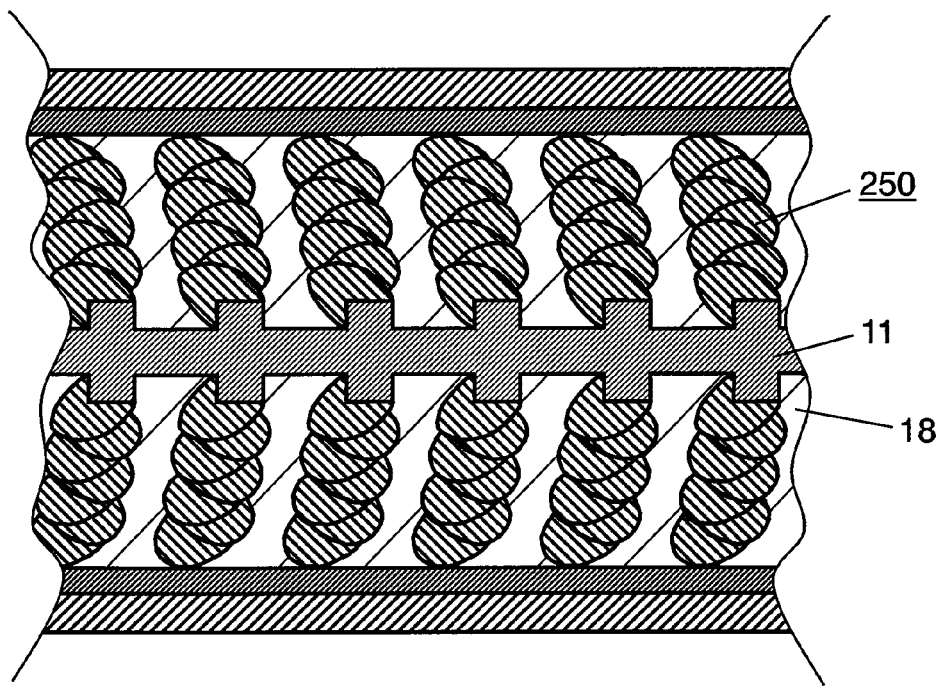
FIG. 11B is a partially sectioned schematic view of the negative electrode employed in the secondary battery according to the second exemplary embodiment of the invention, showing a state after having been charged.

FIG. 10A is a plan view showing schematically a winding state of the electrode group of the non-aqueous electrolyte secondary battery according to the second exemplary embodiment of the invention, and FIG. 10B is a partially enlarged sectional view illustrating in detail a structure of the negative electrode shown in FIG. 10A. FIG. 11A is a partially sectioned schematic view of the negative electrode employed in the secondary battery according to the second exemplary embodiment of the invention, showing a state before the battery is charged, and FIG. 11B is a partially sectioned schematic view of the negative electrode employed in the secondary battery according to the same exemplary embodiment, showing another state after the battery has been charged.

Electrode group 4 comprises positive electrode 1 provided with positive electrode lead 8, and negative electrode 2 provided with negative lead 9 at one end and disposed in a position confronting positive electrode 1, wherein these electrodes are wound with separator 3 interposed therebetween, as shown in FIG. 10A. Negative electrode 2 comprises current collector 11 having concave portions 12 and convex portions 13 formed thereon, and columnar bodies 250 formed discretely at least on convex portions 13 with seven stages, or n=7, of columnar body portions, which are overlapped one after another in a manner to tilt to the trailing end of winding, as illustrated in FIG. 10B. Columnar body portion 257 provided at the uppermost stage of columnar body 250 is so formed that a tip end thereof tilts toward the trailing end of winding direction of the electrode group (i.e., to the end of a wound roll).

Columnar bodies 250 formed of seven stages of overlapped columnar body portions in the tilting manner on convex portions 13 of current collector 11 expand in their volumes due to insertion of lithium ions when the non-aqueous electrolyte secondary battery is charged. In this instance, the tilting angles of the individual columnar body portions 251 to 257 of columnar bodies 250 increase with expansion of their volumes, as will be discussed in detail below by referring to FIG. 11A and FIG. 11B. This results in deformation of columnar bodies 250 in a manner to rise upright, for instance. When discharged, on the contrary, the individual tilting angles decrease and columnar bodies 250 return close to their initial shape as their volumes contract due to extraction of the lithium ions, as shown in FIG. 11A.

At the start of charging, columnar bodies 250 having the seven stages of the columnar body portions are uprightly tilted on convex portions 13 of current collector 11 in such shape that they partially cover concave portions 12 in current collector 11 when columnar bodies 250 are observed in a projected plane from the side of positive electrode 17, as is shown in FIG. 11A. This structure can therefore prevent deposition of lithium metal since lithium ions extracted from positive electrode 17 during a charging process are interfered with by columnar bodies 250 of the negative electrode, and most of the lithium ions are inserted by columnar bodies 250 instead of reaching directly to concave portions 12 in current collector 11. The tilting angles of the seven stages of the individual columnar body portions increase with insertion of the lithium ions, as discussed in the first exemplary embodiment with reference to FIG. 6A and FIG. 6B.

Columnar bodies 250 comprising the seven stages of the columnar body portions are in their upright state above current collector 11 when the battery is fully charge, as shown in FIG. 11B. Under this condition, electrolyte 18 retained around the adjoining columnar bodies 250 is easily movable in the spaces formed around them when the fully charged battery is discharged. The movement of lithium ions are therefore not disturbed since electrolyte 18 around the adjoining columnar bodies 250 flows freely by convection in the spaces around them. As a result, this structure can significantly improve characteristics of high-rate discharge as well as low-temperature discharge.

Furthermore, the fully charged columnar bodies 250 expand due to the insertion of lithium ions, and are subjected to a stress in the direction of thickness of the electrode, as described in the first exemplary embodiment with FIG. 5. In this case, the stress is divided into a horizontal component force and a reaction force, which is impressed upon the columnar bodies 250.

The reaction force impressed on columnar bodies 250 is relieved by among the columnar body portions formed into the overlapping configuration, while the reduced height of the individual columnar body portions decreases their moments of force, so as to reduce concentration of the stress on the junctions. There is thus achieved the non-aqueous electrolyte secondary battery of superior reliability and cycle characteristics, and not liable to separation and deformation.

On the other hand, the horizontal component force impressed on columnar bodies 250 forces the negative electrode of the electrode group to shift toward the leading end of winding to tighten winding of the electrode group. This action cancels out the expansion of the negative electrode due to the insertion of lithium ions, to prevent the electrode group from changing the outer diameter thereof. Accordingly, this embodiment can reduce deformation of the electrode group. Furthermore, the embodiment allows the electrode group to be of substantially the same size as the inner diameter of the battery case, while also reducing the changes in size of the electrode group attributable to insertion and extraction of lithium ions. This structure can therefore prevent the electrode group from moving relative to the battery case when the second battery is dropped or subjected to impacts, thereby achieving the non-aqueous electrolyte secondary battery of high reliability.

Columnar bodies 250 of the negative electrode for use in the non-aqueous electrolyte secondary battery according to the second exemplary embodiment of this invention can be manufactured by basically the same method as that of the first exemplary embodiment described with reference to FIG. 7A to FIG. 7D, and FIG. 8. Details of the method shall therefore be omitted here. Namely, the negative electrode of the present embodiment differs from that of the first exemplary embodiment in respect of that the columnar bodies are formed of a different number of stages of the columnar body portions, and the columnar body portions tilted to one orientation are formed differently in their height from the other columnar body portions tilted to the opposite orientation, but the manufacturing methods are analogous.

The exemplary embodiment described above is an example of the columnar bodies composed of seven stages, i.e., n=7, of the columnar body portions. However, this is not restrictive, and that the "stage n" may be of any integral number not smaller than 7, such as n=10 to n=100, which can be selectively designed as appropriate according to the capacity, cycle characteristics and reliability required for the battery.

Figure 12:
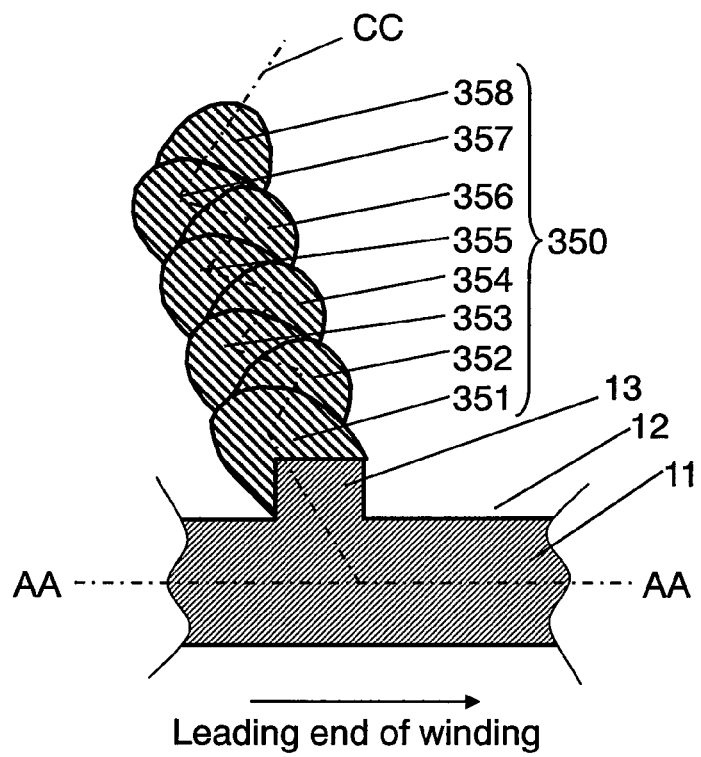
FIG. 12 is a partially enlarged sectional view showing another example of the negative electrode structure according to the second exemplary embodiment of the invention.

Referring now to FIG. 12, description is provided of another example of the negative electrode according to the second exemplary embodiment of this invention. FIG. 12 is a partially enlarged sectional view showing a structure of another example of the negative electrode in the second embodiment of this invention.

As shown in FIG. 12, the negative electrode of this example differs from the previous example in respect of that columnar body portions 358 at the uppermost stage of columnar bodies 350 are formed in a manner to tilt toward the leading end of the winding direction of the electrode group as indicated by the line CC. Detailed description will be omitted for other members having the same structures and materials such as the positive electrode mixture layer, positive electrode current collector, negative electrode current collector, columnar body and the like, as well as the manufacturing method since they are analogous to those of the previously described example.

In other words, current collector 11 is provided with concave portions 12 and convex portions 13, and columnar bodies 350, each composed of eight stages, i.e., n=8, of columnar body portions 351 to 358, and formed on the top portions of convex portions 13 with an active material expressed by the formula of SiOx in an overlapping manner as shown in FIG. 12. Here, columnar body portions 351, 353, 355 and 357 of the odd-number stages and columnar body portions 352, 354, 356 and 358 of the even-number stages composing columnar bodies 350 are formed in different orientations as shown by the line CC in the figure.

Because of this structure, wherein the entire columnar bodies 350 are tilted toward the trailing end of the winding direction, columnar body portions 358 at the uppermost stage of columnar bodies 350 can be tilted to any orientation without specific restrictions. This structure can thus realize the negative electrode with high degree of designing flexibility.

Although the exemplary embodiment described above is the columnar bodies composed of eight stages, i.e., n=8, of the columnar body portions, this is only an example and not restrictive. The "stage n" may be of any integral number not smaller than 8, such as n=10 to n=100, for instance, which can be selectively designed as appropriate according to the capacity, cycle characteristics and reliability required for the battery.

The present invention will be described hereinafter in more concrete manner by way of embodied examples. It should be understood, however, that the following examples are not to be taken in a limited sense, but the present invention can be embodied or practiced in other specific forms including modifications and variations in the materials used without departing from the true spirit and scope of this invention.

EMBODIED EXAMPLE 1

A manufacturing apparatus shown in FIG. 8 was used for preparation of the negative electrode of cylindrical configuration.

First, using a band-like electrolytic copper foil having a thickness of 30 μm, convex portions were formed on its surface at 20 μm intervals by the plating method to prepare a current collector.

Using silicon (Si) as a negative electrode active material, first stage of columnar body portions composed of SiOx were formed with a deposition unit (i.e., a unit assembled with a deposition source, a crucible pot and an electron beam generator) within a vacuum chamber, an inside of which was filled with oxygen gas of a 99.7% purity through an oxygen nozzle. Here, a value of x of the compound SiOx is varied in a width direction of the columnar body portions. In this process, the inside of the vacuum chamber was maintained at 3.5 Pa in pressure of oxygen atmosphere. An electron beam generated by the electron beam generator was deflected with a deflection yoke and irradiated to the deposition source. A scrap material produced in the process of making a semiconductor wafer (i.e., scrap silicon of a 99.999% purity) was used for the deposition source.

In this process of forming the columnar body portions, a tilting angle for the current collector to travel was adjusted to a predetermined degree to obtain angles $\omega_1$ and $\omega_2$ of 60° on average, and the film-deposition rate set to approximately 8 nm/sec. The first stage of the columnar body portions (e.g., 7 μm in height) were thus formed. Using the manufacturing method described in the first exemplary embodiment, second stage and third stage of the columnar body portions (e.g., 7 μm in height) were formed in the same manner, to complete forming the columnar bodies composed of three stages. Columnar bodies were also formed on the other surface of the current collector in the same manner.

A tilting angle θ of about 41° was recorded on the columnar body portions of the individual stages when angles of the columnar bodies were examined with respect to a plane of the current collector by observation of a sectioned surface with a scanning electron microscope (Model S-4700 made by Hitachi). The columnar bodies formed here were 21 μm in the thickness (i.e., height) as measured along a direction of the normal.

Distribution of the oxygen was examined by measuring a linear distribution along the sectioned surface of individual stages of columnar body portions composing the columnar bodies of the negative electrode with an electron-beam probe micro-analyzer (referred to hereinafter as "EPMA"), and both the first stage and the second stage of the columnar body portions showed a continual increase in the oxygen concentration (i.e., value of x) in a direction of one side having a tilting angle of (180-θ) from another side having a tilting angle θ along the width direction of the individual columnar body portions. The directions of increase in the oxygen concentration (i.e., value of x) were opposite to each other between the columnar body portions of the first stage and the second stage. The measured values of x at this time were in a range of 0.1 and 2, with 0.6 on average.

The above processes completed the negative electrode provided with the columnar bodies having different content ratios of the oxygen element at least in the width direction along the tilting orientation of the individual columnar body portions.

Following the above, a Li metal was deposited to a thickness of 12 μm on a surface of the negative electrode by means of vacuum deposition. An inner side of the negative electrode not confronting a positive electrode is provided with a 30 mm-long exposed area of the copper foil, and a negative electrode lead made of Ni was welded.

A positive electrode having a positive electrode active material capable of inserting and extracting lithium ions was made next by using the following method.

First, 93 parts by weight of $LiCoO_2$ powder serving as the positive electrode active material and 4 parts by weight of acetylene black serving as a conductive agent were mixed. The resultant powder was further mixed with a solution (Catalog No. 1320 manufactured by Kureha Chemical Industry Co., Ltd.) made of poly-vinylidene fluoride (PVDF) dissolved in N-methyl-2-pyrrolidone (NMP), which was used as a binder, so that a weight of PVDF becomes 3 parts by weight.

A paste of positive electrode mixture material was then made by adding an appropriate amount of NMP to the above mixture. This paste of positive electrode mixture material was applied to a positive electrode current collector made of an aluminum foil (Al of 15 μm in thickness) by using a doctor blade method, this positive electrode mixture layer was rolled out to obtain a density of 3.5 g/cc and a thickness of 140 μm, and it was thoroughly dried at 85° C. This foil was cut to 57 mm in width and 800 mm in length to prepare the positive electrode. An inner side of the positive electrode not confronting the negative electrode was provided with a 30 mm-long exposed area of the aluminum foil, and a positive electrode lead made of Al was welded thereto.

The negative electrode and the positive electrode prepared in the above steps were wound with a separator made of a 20 μm-thick polypropylene placed between them, to complete an electrode group.

The completed electrode group was inserted in a battery case having an open end prepared for a cylindrical battery (made of a Ni-plated steel, 18 mm in diameter and 65 mm in height) with insulation plates placed between the battery case and the electrode group, and the battery was produced by welding the negative electrode lead to the battery case, and the positive electrode lead to a sealing plate.

After the produced battery was dried by heating it to 60° C. in a vacuumed atmosphere, it was filled with 5.8 g of an electrolyte consisting of 1.2 mol/dm$^3$ of $LiPF_6$ dissolved in a non-aqueous solvent containing ethylene carbonate (EC), dimethyl carbonate (DMC) and ethyl-methyl carbonate (EMC) in a ratio of 2:3:3 (in volume), and the sealing plate was sealed by crimping it with the battery case to thus complete a non-aqueous electrolyte secondary battery. This battery was designated as sample 1.

EMBODIED EXAMPLE 2

A negative electrode was produced in the same manner as the embodied example 1, except that columnar bodies were composed of five stages, or n=5, of columnar body portions, each having a height of approximately 4 μm.

Tilting angles of about 41° were recorded on the columnar body portions of the individual stages, and the completed columnar bodies had 20 μm in thickness (i.e., height).

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the odd-number stages and the even-number stages. The measured values of x at this time were in a range of 0.1 and 2, with 0.6 on average.

A non-aqueous electrolyte secondary battery was produced by using the same method as the embodied example 1 with an exception of employing the above negative electrode, and the battery was designated as sample 2.

EMBODIED EXAMPLE 3

A negative electrode was produced in the same manner as the embodied example 1, except that columnar bodies were composed of ten stages, or n=10, of columnar body portions, each having a height of approximately 2 μm, of which only the columnar body portions of first stage were tilted toward a direction opposite to the other columnar body portions.

Tilting angles of about 41° were recorded on the columnar body portions of the individual stages, and the completed columnar bodies had 20 μm in thickness (i.e., height).

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the odd-number stages and the even-number stages. The measured values of x at this time were in a range of 0.1 and 2, with 0.6 on average.

A non-aqueous electrolyte secondary battery was produced by using the same method as the embodied example 1 with an exception of employing the above negative electrode, and the battery was designated as sample 3.

EMBODIED EXAMPLE 4

A negative electrode was produced in the same manner as the embodied example 1, except that columnar bodies were formed with an average angle of $\omega_1$ and $\omega_2$ adjusted to 50°.

Tilting angles of about 31° were recorded on the columnar body portions of the individual stages, and the completed columnar bodies had 21 μm in thickness (i.e., height).

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the first and third stages and the columnar body portions of the second stage. The measured values of x at this time were in a range of 0.1 and 2, with 0.6 on average.

A non-aqueous electrolyte secondary battery was produced by using the same method as the embodied example 1 with an exception of employing the above negative electrode, and the battery was designated as sample 4.

EMBODIED EXAMPLE 5

A negative electrode was produced in the same manner as the embodied example 1, except that the inside of the vacuum chamber was maintained at 1.7 Pa in pressure of oxygen atmosphere, and the columnar body portions of the individual stages were formed in a thickness of 8 μm.

Tilting angles of about 41° were recorded on the columnar body portions of the individual stages, and the completed columnar bodies had 24 μm in thickness (i.e., height).

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the first and third stages and the columnar body portions of the second stage. The measured values of x at this time were in a range of 0.1 and 2, with 0.3 on average.

Following the above steps, a Li metal was deposited to a thickness of 14 μm on a surface of the negative electrode with a vacuum deposition method.

A non-aqueous electrolyte secondary battery was produced by using the same method as the embodied example 1 with an exception of employing the above negative electrode, and the battery was designated as sample 5.

EMBODIED EXAMPLE 6

A negative electrode was produced in the same manner as the embodied example 1, except that columnar bodies were composed of seven stages, or n=7, of columnar body portions, of which odd-number stages and even-number stages were approximately 3.5 μm and 2.5 μm respectively.

Tilting angles of about 41° were recorded on the columnar body portions of the individual stages. The completed columnar bodies also had tilting angles of about 41° and thickness (i.e., height) of 21.5 μm.

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the odd-number stages and the even-number stages. The measured values of x at this time were in a range of 0.1 and 2, with 0.6 on average.

A non-aqueous electrolyte secondary battery was produced by using the same method as the embodied example 1 with an exception of employing the above negative electrode, and the battery was designated as sample 6.

EMBODIED EXAMPLE 7

A negative electrode was produced in the same manner as the embodied example 1, except that columnar bodies were composed of eight stages, or n=8, of columnar body portions, of which odd-number stages and even-number stages were approximately 3 μm and 2 μm respectively. In addition, the columnar body portions at the uppermost stage of the columnar bodies were tilted toward the leading end of winding direction.

Tilting angles of about 41° were recorded on the columnar body portions of the individual stages. The completed columnar bodies also had tilting angles of about 41° and thickness (i.e., height) of 20 μm.

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the odd-number stages and the even-number stages. The measured values of x at this time were in a range of 0.1 and 2, with 0.6 on average.

A non-aqueous electrolyte secondary battery was produced by using the same method as the embodied example 1 with an exception of employing the above negative electrode, and the battery was designated as sample 7.

EMBODIED EXAMPLE 8

A negative electrode was produced in the same manner as the embodied example 1, except that columnar bodies were composed of thirty-five stages, or n=35, of columnar body portions, of which odd-number stages and even-number stages were approximately 0.7 μm and 0.5 μm respectively.

Tilting angles of about 41° were recorded on the columnar body portions of the individual stages. The completed columnar bodies also had tilting angles of about 41° and thickness (i.e., height) of 21.1 μm.

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the odd-number stages and the even-number stages. The measured values of x at this time were in a range of 0.1 and 2, with 0.6 on average.

A non-aqueous electrolyte secondary battery was produced by using the same method as the embodied example 1 with an exception of employing the above negative electrode, and the battery was designated as sample 8.

EMBODIED EXAMPLE 9

A negative electrode was produced in the same manner as the embodied example 1, except that columnar bodies were composed of forty stages, or n=40, of columnar body portions, of which odd-number stages and even-number stages were approximately 0.6 μm and 0.4 μm respectively. In addition, the columnar body portions at the uppermost stage of the columnar bodies were tilted toward the leading end of winding direction.

Tilting angles of about 41° were recorded on the columnar body portions of the individual stages. The completed columnar bodies also had tilting angles of about 41° and thickness (i.e., height) of 20 μm.

Measurement of the EPMA showed that the oxygen concentration (i.e., value of x) increases continually in a direction of one side having a tilting angle of (180-θ) from another side having a tilting angle of θ along the width direction of the individual columnar body portions. The directions of increase in the oxygen concentration (i.e., value of x) were opposite to each other between the columnar body portions of the odd-number stages and the even-number stages. The measured values of x at this time were in a range of 0.1 and 2, with 0.6 on average.

A non-aqueous electrolyte secondary battery was produced by using the same method as the embodied example 1 with an exception of employing the above negative electrode, and the battery was designated as sample 9.

COMPARISON EXAMPLE 1

A negative electrode was produced by using the same method as the embodied example 1 except that the columnar bodies were composed of single stage having 20 μm in height (i.e., thickness), and their tip portions were tilted toward the trailing end of winding direction.

A tilting angle about 41° was recorded on the columnar bodies when examined for the angles of the columnar bodies with respect to a plane of the current collector by observation of a sectioned surface of the negative electrode with a scanning electron microscope (Model S-4700 made by Hitachi). The columnar bodies formed here were 20 μm in the thickness (i.e., height).

Distribution of the oxygen was examined by measuring a linear distribution along a sectioned surface of the columnar bodies composing the negative electrode with an EPMA, and the result showed a continual increase in the oxygen concentration (i.e., value of x) in a direction of one side having a tilting angle of (180-θ) from another side having a tilting angle θ along the width direction of the columnar bodies. The measured values of x were in a range of 0.1 and 2, with 0.6 on average.

A non-aqueous electrolyte secondary battery was produced by using the same method as the embodied example 1 with an exception of employing the above negative electrode, and designated as sample C1.

COMPARISON EXAMPLE 2

A negative electrode was produced by using the same method as the embodied example 1 except that the columnar bodies were composed of single stage having 20 μm in height (i.e., thickness), and their tip portions were tilted toward the leading end of winding direction.

A tilting angle about 41° was recorded on the columnar bodies when examined for the angles of the columnar bodies with respect to a plane of the current collector by observation of a sectioned surface of the negative electrode with a scanning electron microscope (Model S-4700 made by Hitachi). The columnar bodies formed here were 20 μm in the thickness (i.e., height).

Distribution of the oxygen was examined by measuring a linear distribution along a sectioned surface of the columnar bodies composing the negative electrode with an EPMA, and the result showed a continual increase in the oxygen concentration (i.e., value of x) in a direction of one side having a tilting angle of (180-θ) from another side having a tilting angle θ along the width direction of the columnar bodies. The measured values of x were in a range of 0.1 and 2, with 0.6 on average.

A non-aqueous electrolyte secondary battery was produced by using the same method as the comparison example 1 with an exception of employing the above negative electrode, and designated as sample C2.

COMPARISON EXAMPLE 3

A negative electrode was produced in the same manner as the comparison example 2, except that the columnar bodies were composed of three stages, or n=3, of columnar body portions, each having 7 μm in height, and the tip portions of the odd-number stages were tilted toward the leading end of winding direction.

A tilting angle about 41° was recorded on the columnar body portions of the individual stages when angles of the columnar bodies were examined with respect to a plane of the current collector by observation of a sectioned surface of the negative electrode with a scanning electron microscope (Model S-4700 made by Hitachi). The columnar bodies formed here were 21 μm in the thickness (i.e., height).

Distribution of the oxygen was examined by measuring a linear distribution along a sectioned surface of the columnar bodies composing the negative electrode with an EPMA, and the result showed a continual increase in the oxygen concentration (i.e., value of x) in a direction of one side having a tilting angle of $(180-\theta_1)$ from another side having a tilting angle θ along the width direction of the columnar bodies. The measured values of x were in a range of 0.1 and 2, with 0.6 on average.

A non-aqueous electrolyte secondary battery was produced by using the same method as the comparison example 1 with an exception of employing the above negative electrode, and designated as sample C3.

The individual non-aqueous electrolyte secondary batteries produced as above were evaluated for the following characteristics.

Measurement of Battery Capacity

The individual non-aqueous electrolyte secondary batteries were subjected to an electric charge and discharge under the following conditions in an ambient temperature of 25° C.

First, each of the batteries was charged at a constant voltage until the cell voltage became 4.2V with a constant current of a value corresponding to an hour rate of 0.7 C to the design capacity (2800 mAh), followed by a reduced current value corresponding to an hour rate of 0.05 C at a constant voltage of 4.2V. The batteries were put to a rest thereafter for 30 minutes.

Afterwards, the batteries were discharged until the cell voltage decreases to 2.5V with a constant current of a value corresponding to an hour rate of 0.2 C. Discharge capacities taken here were recorded as battery capacity values.

Capacity Retaining Ratio

The individual non-aqueous electrolyte secondary batteries were subjected to repeated cycles of charge and discharge under the following conditions in an ambient temperature of 25° C.

First, each of the batteries was charged until the cell voltage became 4.2V with a constant current of a value corresponding to an hour rate of 0.5 C to the design capacity (2800 mAh), followed by a reduced current value corresponding to an hour rate of 0.05 C at a constant voltage of 4.2V. The batteries were put to a rest thereafter for 30 minutes.

Thereafter, the batteries were discharged until the cell voltage decrease to 2.5V with a constant current of a value corresponding to an hour rate of 1.0 C. The batteries were put to a rest thereafter for 30 minutes.

One complete cycle consisting of the above charge and discharge cycle was repeated 300 times. A ratio of a discharge capacity at the 100th cycle or the 300th cycle, for instance, against a discharge capacity in the first cycle expressed in percentage value was recorded as the capacity retaining ratio (%). In other words, a capacity retaining ratio nearer to 100 indicates as being superior in the charge and discharge cycle characteristics.

Measurement of Electrode Group Diameter

The batteries subjected to the charge and discharge cycle test were first examined with CT ("Computer Tomography") scanning for any sign of deformation on the electrode groups under the fully charged condition.

Diameters of the electrode groups were then measured by processing the CT scan images. At the start, secondary batteries having 17.50 mm in the diameter of the electrode group were selected, and diameters were measured using a position of the negative electrode lead as a point of reference. Changes in the diameters after the 300th cycle were compared with that taken at the 100th cycle, and recorded by percentage values.

Table 1 and Table 2 show various parameters and corresponding results of the evaluation on samples 1 to 9 and samples C1 to C3.

TABLE 1

| | Tilting direction of columnar body at tip portion | $O_2$ filled vacuum pressure (Pa) | "n" (stage) | Tilting angle of columnar body portion (°) | Tilting angle of columnar body (°) | Columnar body portion thick (μm) | Columnar body thick (μm) | value of x average of SiOx |
|---|---|---|---|---|---|---|---|---|
| Sample 1 | winding trailing end | 3.5 | 3 | 41 | — | 7 | 21 | 0.6 |
| Sample 2 | winding trailing end | 3.5 | 5 | 41 | — | 4 | 20 | 0.6 |
| Sample 3 | winding trailing end | 3.5 | 10 | 41 | — | 2 | 20 | 0.6 |
| Sample 4 | winding trailing end | 3.5 | 3 | 31 | — | 7 | 21 | 0.6 |
| Sample 5 | winding trailing end | 1.7 | 3 | 41 | — | 8 | 24 | 0.3 |
| Sample 6 | winding trailing end | 3.5 | 7 | 41 | 41 | 3.5, 2.5 | 21.5 | 0.6 |
| Sample 7 | winding leading end | 3.5 | 8 | 41 | 41 | 3, 2 | 20 | 0.6 |
| Sample 8 | winding trailing end | 3.5 | 35 | 41 | 41 | 0.7, 0.5 | 21.1 | 0.6 |
| Sample 9 | winding leading end | 3.5 | 40 | 41 | 41 | 0.6, 0.4 | 20 | 0.6 |
| Sample C1 | winding trailing end | 3.5 | 1 | 41 | 41 | 20 | 20 | 0.6 |
| Sample C2 | winding leading end | 3.5 | 1 | 41 | 41 | 20 | 20 | 0.6 |
| Sample C3 | winding leading end | 3.5 | 3 | 41 | — | 7 | 21 | 0.6 |

TABLE 2

| | No. of cycles (times) | Capacity retaining ratio (%) | Deformation of electrode group | Ratio of change in diameter of electrode group (%) |
|---|---|---|---|---|
| Sample 1 | 100 | 91 | None | 100 |
| | 300 | 81 | None | 100.2 |
| Sample 2 | 100 | 90 | None | 100 |
| | 300 | 83 | None | 100.4 |
| Sample 3 | 100 | 91 | None | 100 |
| | 300 | 85 | None | 100.4 |
| Sample 4 | 100 | 91 | None | 100 |
| | 300 | 82 | None | 100.3 |
| Sample 5 | 100 | 89 | None | 100 |
| | 300 | 77 | None | 100.3 |
| Sample 6 | 100 | 90 | None | 100 |
| | 300 | 83 | None | 100.2 |

TABLE 2-continued

|  | No. of cycles (times) | Capacity retaining ratio (%) | Deformation of electrode group | Ratio of change in diameter of electrode group (%) |
|---|---|---|---|---|
| Sample 7 | 100 | 91 | None | 100 |
|  | 300 | 84 | None | 100.2 |
| Sample 8 | 100 | 90 | None | 100 |
|  | 300 | 84 | None | 100.2 |
| Sample 9 | 100 | 91 | None | 100 |
|  | 300 | 83 | None | 100.2 |
| Sample C1 | 100 | 90 | None | 100 |
|  | 300 | 48 | None | 100.5 |
| Sample C2 | 100 | 82 | Yes | 100 |
|  | 211 | 40 | Yes | 106.1 |
| Sample C3 | 100 | 90 | None | 100 |
|  | 300 | 65 | Yes | 100.6 |

Figure 13:
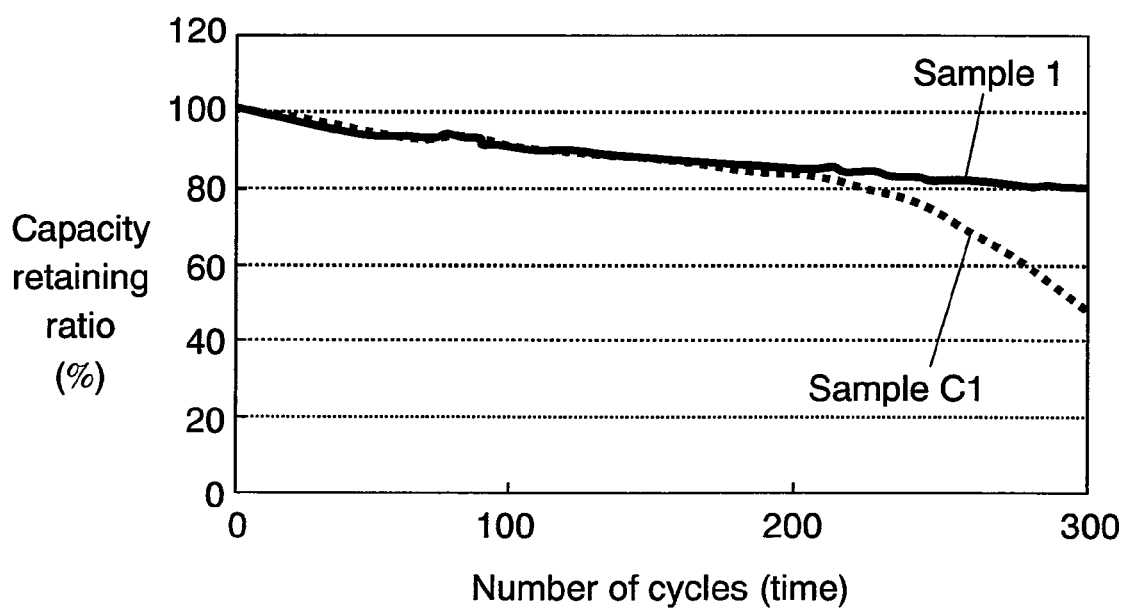
FIG. 13 is a graphic representation showing examples of characteristics of charging and discharging cycles on an embodied sample and a comparison sample.

In addition, FIG. 13 shows results of the evaluation on sample 1 and sample C1, representing typical examples of the cycle characteristics.

It is found from the comparison between samples 1 and C1 that there was no difference in their capacity retaining ratios at the 100th cycle in the initial period of the charge and discharge cycles, as shown in Table 1, Table 2 and FIG. 13. At the end of 300th cycle, however, sample C1 exhibited a decrease to about 48% and sample C2 exhibited to about 40%, whereas sample 1 showed only about 81% in the capacity retaining ratio.

There was no significant deformation of the electrode groups in all batteries, except for sample C2. Upon close examination of the disassembled negative electrodes taken out of the evaluated batteries, however, a large number of separations of the columnar bodies were observed on sample C1, of which the columnar bodies are formed of only single stage of the columnar body portions. This is thought to be attributable to the stresses concentrated on the junctions between the current collector and the columnar bodies due to expansion and contraction caused by the electrical charges and discharges. The result in FIG. 13 indicates a sudden decrease in the capacity of sample C1 at about 150 cycles, and it can therefore be presumed that the main factor of it is the separations that could have progressed rapidly at that point.

Although not specifically show in the figure, sample C2 had not completed the 300 cycles of operation due to deformation of the electrode group. The deformation was observed at the point of 100 cycles, and the disassembled battery revealed a large number of separations of the columnar bodies.

On this contrary, there was hardly any separation of the columnar bodies in the sample 1. This result is presumed to be due to the noble structure of distributing the stresses of the junctions into the bent portions between the columnar body portions.

Sample C3 exhibited a superior cycle characteristics as compared to sample C2 since the former has the columnar bodies composed of three stages of the columnar body portions. However, it showed a deformation in the electrode group at the end of the 300 cycles, and separations of the columnar bodies were observed around the deformed area.

Samples 2, 3 and 6 to 9 having columnar body portions of the increased numbers of stages showed tendencies of improvement in the cycle characteristics as the number of stages increases. None of the samples showed any sign of deformation in their electrode groups, and there were no considerable changes in them.

Sample 4 having columnar bodies of a smaller tilting angle exhibited superior cycle characteristics as compared to sample 1. The reason of this is thought to be due to the substantial effect of its structure, in which the stresses produced by expansion and contraction during the electrical charges and discharges are divided into the horizontal component forces directed to the winding direction more effectively.

Sample 5 has the columnar bodies of smaller value of x since the columnar bodies were formed in the oxygen environment of a reduces pressure. This makes the columnar bodies liable to expand easily, and therefore develops larger stresses. The results indicated that this sample has relatively poor cycle characteristics as compared to sample 1. However, adoption of the invented columnar bodies having their columnar body portions at the uppermost stage tilted toward the trailing end of winding direction could achieve the cycle characteristics that is superior than that of sample C3, even though the columnar bodies of sample C3 showed less degree of expansion and contraction.

Comparisons were further made between samples 6 and 7 as well as samples 8 and 9, of which the columnar bodies are tilted to the trailing end of winding direction whereas only their columnar body portions at the uppermost stage are tilted toward either the trailing end or the leading end of the winding direction. The results showed that samples 7 and 9 have lower degrees of the capacity retaining ratio. This is considered to be attributable to small differences in the reaction forces impressed on the columnar bodies when the electrode groups expand, which may be affected by the tilting orientations of the columnar body portions at the uppermost stages.

Comparisons among samples 7, 9, C2 and C3 revealed that samples 7 and 9 have larger values of the capacity retaining ratio, but smaller ratios of changes in the diameters of their electrode groups. These results may be due to the structures of samples C2 and C3 that the columnar bodies are not tilted entirely to the trailing end of the winding direction, which makes them not capable of absorbing the stresses produced by expansion and contraction of the columnar bodies to exert the effect of tightening the winding of the electrode groups even though the tilting orientation of their columnar body portions at the uppermost stage is in line with the leading end of the winding direction, thereby resulting in the expansion of the diameters.

What is claimed is:

1. A non-aqueous electrolyte secondary battery comprising:
    a negative electrode having a current collector provided thereon with convex portions, and columnar bodies formed on the convex portions, each of the columnar bodies comprising n stages of columnar body portions overlaid one after another in a manner to tilt alternately to different orientations along a longitudinal direction of the current collector;
    a positive electrode having a positive electrode current collector provided on both surfaces thereof with a positive electrode mixture layer containing a positive electrode active material capable of inserting and extracting lithium ions reversibly; and
    a separator interposed between the positive electrode and the negative electrode in a confronting manner,
    wherein n≧2, and odd numbered stages have a height different than even numbered stages, the stage closest to the convex portion being an odd numbered stage, and wherein tip portions of the columnar body portions at the uppermost stage of the columnar bodies on the negative electrode are tilted toward a trailing end of winding direction.

2. A non-aqueous electrolyte secondary battery comprising:
- a negative electrode having a current collector provided thereon with convex portions, and columnar bodies formed on the convex portions, each of the columnar bodies comprising n stages of columnar body portions overlaid one after another in a manner to tilt alternately to different orientations along a longitudinal direction of the current collector;
- a positive electrode having a positive electrode current collector provided on both surfaces thereof with a positive electrode mixture layer containing a positive electrode active material capable of inserting and extracting lithium ions reversibly; and
- a separator interposed between the positive electrode and the negative electrode in a confronting manner,
- wherein n≧2, and odd numbered stages have a height different than even numbered stages, the stage closest to the convex portion being an odd numbered stage, and
- wherein the columnar bodies are tilted toward a trailing end of winding direction.

3. The non-aqueous electrolyte secondary battery of claim 2, wherein tip portions of the columnar body portions at the uppermost stage of the columnar bodies are tilted toward a leading end of winding direction.

4. The non-aqueous electrolyte secondary battery in one of claim 1 and claim 2, wherein a content ratio of an element composing the columnar body portions is varied along a width direction in a tilting orientation.

5. The non-aqueous electrolyte secondary battery of claim 4, wherein the content ratio of the element is varied along different directions between an odd-number stage and an even-number stage of the columnar body portions.

6. The non-aqueous electrolyte secondary battery of claim 4, wherein an acute angle formed at one side of an intersection between a center line in the tilting orientation of the columnar body portion and a plane of the current collector becomes greater at least during a charging state than the angle during a discharging state.

7. The non-aqueous electrolyte secondary battery in one of claim 1 and claim 2, wherein the columnar body portions include an active material having at least a property of reversibly inserting and extracting lithium ions and a theoretical capacity density exceeding 833 mAh/cm$^3$.

8. The non aqueous electrolyte secondary battery of claim 7, wherein the active material includes a material containing at least silicon, as expressed by the formula of SiOx.

9. The non-aqueous electrolyte secondary battery of claim 8, wherein a value of x of the material containing silicon is increased continually from one side forming an acute angle at an intersection between a center line in the tilting orientation of the columnar body portions and a plane of the current collector toward another side forming an obtuse angle.

* * * * *